(12) United States Patent
Laroia et al.

(10) Patent No.: US 9,967,535 B2
(45) Date of Patent: May 8, 2018

(54) METHODS AND APPARATUS FOR REDUCING NOISE IN IMAGES

(71) Applicant: THE LIGHTCO INC., Palo Alto, CA (US)

(72) Inventors: Rajiv Laroia, Far Hills, NJ (US); Nitesh Shroff, Palo Alto, CA (US); Sapna A Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 75 days.

(21) Appl. No.: 14/859,103

(22) Filed: Sep. 18, 2015

(65) Prior Publication Data

US 2016/0309133 A1 Oct. 20, 2016

Related U.S. Application Data

(60) Provisional application No. 62/149,498, filed on Apr. 17, 2015.

(51) Int. Cl.
*H04N 13/00* (2006.01)
*G06T 5/00* (2006.01)
(Continued)

(52) U.S. Cl.
CPC ......... *H04N 13/0007* (2013.01); *G06T 5/002* (2013.01); *G06T 5/20* (2013.01);
(Continued)

(58) Field of Classification Search
CPC ............. H04N 13/0007; H04N 5/2258; H04N 5/23212; H04N 5/23245; H04N 5/23258;
(Continued)

(56) References Cited

U.S. PATENT DOCUMENTS

| 4,544,241 A | 10/1985 | LaBudde et al. |
| 4,890,133 A | 12/1989 | Ogawa et al. |

(Continued)

FOREIGN PATENT DOCUMENTS

| EP | 2642757 A2 | 9/2013 |
| JP | 10091765 | 4/1998 |

(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

(Continued)

*Primary Examiner* — Jay Patel
*Assistant Examiner* — Marnie Matt
(74) *Attorney, Agent, or Firm* — Straub & Straub; Michael P. Straub; Stephen T. Straub

(57) ABSTRACT

Various features relating to reducing and/or eliminating noise from images are described. In some embodiments depth based denoising is used on images captured by one or more camera modules based on depth information of a scene area and optical characteristics of the one or more camera modules used to captures the images. In some embodiments by taking into consideration the camera module optics and the depth of the object included in the image portion, a maximum expected frequency can be determined and the image portion is then filtered to reduce or remove frequencies above the maximum expected frequency. In this way noise can be reduced or eliminated from image portions captured by one or more camera modules. The optical characteristic of different camera modules may be different. In some embodiments a maximum expected frequency is determined on a per camera module and depth basis.

23 Claims, 22 Drawing Sheets

(51) Int. Cl.

| | | |
|---|---|---|
| *G06T 5/20* | (2006.01) | |
| *G06T 5/50* | (2006.01) | |
| *H04N 5/225* | (2006.01) | |
| *H04N 5/232* | (2006.01) | |
| *H04N 5/235* | (2006.01) | |
| *H04N 5/247* | (2006.01) | |
| *H04N 5/357* | (2011.01) | |
| *H04N 13/02* | (2006.01) | |

(52) U.S. Cl.
CPC ............ *G06T 5/50* (2013.01); *H04N 5/2258* (2013.01); *H04N 5/2328* (2013.01); *H04N 5/2353* (2013.01); *H04N 5/2354* (2013.01); *H04N 5/23212* (2013.01); *H04N 5/23245* (2013.01); *H04N 5/23258* (2013.01); *H04N 5/23296* (2013.01); *H04N 5/247* (2013.01); *H04N 5/357* (2013.01); *H04N 13/0271* (2013.01); *G06T 2207/10024* (2013.01); *G06T 2207/10028* (2013.01)

(58) Field of Classification Search
CPC ............ H04N 5/2328; H04N 5/23296; H04N 5/2353; H04N 5/2354; H04N 5/247; H04N 5/357; H04N 13/0271; G01B 11/00; G06T 5/002; G06T 5/20; G06T 2207/10024; G06T 2207/10028
USPC .......................................................... 348/49
See application file for complete search history.

(56) References Cited

U.S. PATENT DOCUMENTS

| | | | |
|---|---|---|---|
| 5,078,479 | A | 1/1992 | Vuilleumier |
| 5,153,569 | A | 10/1992 | Kawamuraa et al. |
| 5,353,068 | A | 10/1994 | Moriwake |
| 5,583,602 | A | 12/1996 | Yamamoto |
| 5,781,331 | A | 7/1998 | Carr et al. |
| 5,889,553 | A | 3/1999 | Kino et al. |
| 5,975,710 | A | 11/1999 | Luster |
| 5,982,951 | A | 11/1999 | Katayama et al. |
| 6,011,661 | A | 1/2000 | Weng |
| 6,028,600 | A | 2/2000 | Rosin et al. |
| 6,081,670 | A | 6/2000 | Madsen et al. |
| 6,141,034 | A | 10/2000 | McCutchen |
| 6,201,899 | B1 * | 3/2001 | Bergen ............... G06K 9/00134 382/106 |
| 7,009,652 | B1 | 3/2006 | Tanida et al. |
| 7,280,735 | B2 | 10/2007 | Thibault |
| 7,315,423 | B2 | 1/2008 | Sato |
| 7,551,358 | B2 | 6/2009 | Lee et al. |
| 7,561,201 | B2 | 7/2009 | Hong |
| 7,801,428 | B2 | 9/2010 | Nagaishi et al. |
| 7,810,511 | B2 | 10/2010 | Fagrenius et al. |
| 8,144,230 | B2 | 3/2012 | Watanabe et al. |
| 8,194,169 | B2 | 6/2012 | Tamaki et al. |
| 8,199,222 | B2 | 6/2012 | Drimbarean et al. |
| 8,237,841 | B2 | 8/2012 | Tanida et al. |
| 8,320,051 | B2 | 11/2012 | Matsumura et al. |
| 8,417,058 | B2 | 4/2013 | Tardif |
| 8,482,637 | B2 | 7/2013 | Ohara et al. |
| 8,520,022 | B1 | 8/2013 | Cohen et al. |
| 8,553,106 | B2 | 10/2013 | Scarff |
| 8,619,082 | B1 | 12/2013 | Ciurea et al. |
| 8,639,296 | B2 | 1/2014 | Ahn et al. |
| 8,665,341 | B2 | 3/2014 | Georgiev et al. |
| 8,704,944 | B1 | 4/2014 | Wierzoch et al. |
| 8,762,895 | B2 | 6/2014 | Metha et al. |
| 8,780,258 | B2 | 7/2014 | Lee |
| 8,896,655 | B2 | 11/2014 | Mauchly et al. |
| 9,041,826 | B2 | 5/2015 | Jung et al. |
| 9,104,705 | B2 | 8/2015 | Fujinaga |
| 9,135,732 | B2 | 9/2015 | Winn et al. |
| 9,197,816 | B2 | 11/2015 | Laroia |
| 9,270,876 | B2 | 2/2016 | Laroia |
| 9,282,228 | B2 | 3/2016 | Laroia |
| 9,325,906 | B2 | 4/2016 | Laroia |
| 9,374,514 | B2 | 6/2016 | Laroia |
| 9,423,588 | B2 | 8/2016 | Laroia |
| 9,426,365 | B2 | 8/2016 | Laroia et al. |
| 9,451,171 | B2 | 9/2016 | Laroia |
| 9,462,170 | B2 | 10/2016 | Laroia et al. |
| 9,467,627 | B2 | 10/2016 | Laroia |
| 9,544,501 | B2 | 1/2017 | Laroia |
| 9,544,503 | B2 | 1/2017 | Shroff |
| 9,547,160 | B2 | 1/2017 | Laroia |
| 9,549,127 | B2 | 1/2017 | Laroia |
| 9,551,854 | B2 | 1/2017 | Laroia |
| 9,554,031 | B2 | 1/2017 | Laroia et al. |
| 9,557,519 | B2 | 1/2017 | Laroia |
| 9,557,520 | B2 | 1/2017 | Laroia |
| 9,563,033 | B2 | 2/2017 | Laroia |
| 9,568,713 | B2 | 2/2017 | Laroia |
| 9,578,252 | B2 | 2/2017 | Laroia |
| 9,671,595 | B2 | 6/2017 | Laroia |
| 9,686,471 | B2 | 6/2017 | Laroia et al. |
| 9,690,079 | B2 | 6/2017 | Laroia |
| 9,736,365 | B2 | 8/2017 | Laroia |
| 9,749,511 | B2 | 8/2017 | Laroia |
| 9,749,549 | B2 | 8/2017 | Shroff |
| D802,646 | S | 11/2017 | Laroia et al. |
| 9,824,427 | B2 | 11/2017 | Pulli et al. |
| 2002/0149691 | A1 | 10/2002 | Pereira et al. |
| 2003/0018427 | A1 | 1/2003 | Yakota et al. |
| 2003/0020814 | A1 | 1/2003 | Ono |
| 2003/0185551 | A1 | 10/2003 | Chen |
| 2004/0027695 | A1 | 2/2004 | Lin |
| 2004/0100479 | A1 | 5/2004 | Nakano et al. |
| 2004/0227839 | A1 | 11/2004 | Stavely et al. |
| 2005/0088546 | A1 | 4/2005 | Wang |
| 2005/0200012 | A1 | 9/2005 | Kinsman |
| 2006/0067672 | A1 | 3/2006 | Washisu et al. |
| 2006/0187311 | A1 | 8/2006 | Labaziewicz et al. |
| 2006/0187338 | A1 | 8/2006 | May et al. |
| 2006/0221218 | A1 | 10/2006 | Alder et al. |
| 2006/0238886 | A1 | 10/2006 | Kushida et al. |
| 2006/0281453 | A1 | 12/2006 | Jaiswal et al. |
| 2007/0050139 | A1 | 3/2007 | Sidman |
| 2007/0065012 | A1 | 3/2007 | Yamakado et al. |
| 2007/0127915 | A1 | 6/2007 | Lu et al. |
| 2007/0177047 | A1 | 8/2007 | Goto |
| 2007/0182528 | A1 | 8/2007 | Breed et al. |
| 2008/0030592 | A1 | 2/2008 | Border et al. |
| 2008/0074755 | A1 | 3/2008 | Smith |
| 2008/0084484 | A1 | 4/2008 | Ochi et al. |
| 2008/0111881 | A1 | 5/2008 | Gibbs et al. |
| 2008/0180562 | A1 | 7/2008 | Kobayashi |
| 2008/0211941 | A1 | 9/2008 | Deever et al. |
| 2008/0219654 | A1 * | 9/2008 | Border ............... H04N 5/2258 396/89 |
| 2008/0240698 | A1 | 10/2008 | Bartilson et al. |
| 2008/0247745 | A1 | 10/2008 | Nilsson |
| 2008/0251697 | A1 | 10/2008 | Park et al. |
| 2008/0278610 | A1 | 11/2008 | Boettiger |
| 2009/0086032 | A1 | 4/2009 | Li |
| 2009/0136223 | A1 | 5/2009 | Motomura et al. |
| 2009/0154821 | A1 | 6/2009 | Sorek et al. |
| 2009/0225203 | A1 | 9/2009 | Tanida et al. |
| 2009/0278950 | A1 | 11/2009 | Deng et al. |
| 2009/0290042 | A1 | 11/2009 | Shiohara |
| 2010/0013906 | A1 | 1/2010 | Border et al. |
| 2010/0034531 | A1 | 2/2010 | Go |
| 2010/0045774 | A1 | 2/2010 | Len et al. |
| 2010/0053414 | A1 | 3/2010 | Tamaki et al. |
| 2010/0079635 | A1 | 4/2010 | Yano et al. |
| 2010/0091089 | A1 | 4/2010 | Cromwell et al. |
| 2010/0097443 | A1 | 4/2010 | Lablans |
| 2010/0225755 | A1 | 9/2010 | Tamaki et al. |
| 2010/0238327 | A1 | 9/2010 | Griffith et al. |
| 2010/0265346 | A1 | 10/2010 | Iizuka |
| 2010/0296802 | A1 | 11/2010 | Davies |
| 2011/0051243 | A1 | 3/2011 | Su |
| 2011/0063325 | A1 | 3/2011 | Saunders |

(56) References Cited

U.S. PATENT DOCUMENTS

| | | |
|---|---|---|
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0188744 A1* | 8/2011 | Sun .................... G06T 5/50 382/162 |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0062691 A1 | 3/2012 | Fowler et al. |
| 2012/0082368 A1* | 4/2012 | Hirai ................ G06T 5/002 382/154 |
| 2012/0155848 A1 | 6/2012 | Labowicz et al. |
| 2012/0162464 A1 | 6/2012 | Kim |
| 2012/0188391 A1 | 7/2012 | Smith |
| 2012/0027462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0020470 A1 | 1/2013 | Luo et al. |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0169934 A1* | 7/2013 | Verdooner ............ A61B 3/14 351/246 |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1* | 10/2013 | Betts-Lacroix .... H04N 13/0242 348/36 |
| 2013/0300860 A1* | 11/2013 | Komatsu ............. G06T 7/571 348/135 |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0240579 A1 | 8/2014 | Park et al. |
| 2014/0267243 A1 | 9/2014 | Venkataraman et al. |
| 2014/0267844 A1 | 9/2014 | Iwata et al. |
| 2014/0293079 A1 | 10/2014 | Milanfar et al. |
| 2014/0340569 A1* | 11/2014 | Raskar ................. G01S 7/493 348/370 |
| 2014/0354714 A1 | 12/2014 | Hirschler et al. |
| 2015/0029595 A1 | 1/2015 | Swihart et al. |
| 2015/0035824 A1* | 2/2015 | Takahashi .......... H04N 13/0271 345/419 |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0241713 A1 | 8/2015 | Laroia et al. |
| 2015/0244927 A1 | 8/2015 | Laroia et al. |
| 2015/0244949 A1 | 8/2015 | Laroia et al. |
| 2015/0253647 A1 | 9/2015 | Mercado |
| 2015/0279012 A1 | 10/2015 | Brown et al. |
| 2015/0296149 A1 | 10/2015 | Laroia |
| 2016/0004144 A1 | 1/2016 | Laroia et al. |
| 2016/0014314 A1 | 1/2016 | Laroia et al. |
| 2016/0091861 A1 | 3/2016 | Liu et al. |
| 2016/0112637 A1 | 4/2016 | Laroia et al. |
| 2016/0112650 A1 | 4/2016 | Laroia et al. |
| 2016/0142610 A1 | 5/2016 | Rivard et al. |
| 2016/0182777 A1 | 6/2016 | Laroia et al. |
| 2016/0306168 A1 | 10/2016 | Singh et al. |
| 2016/0309095 A1 | 10/2016 | Laroia et al. |
| 2016/0309110 A1 | 10/2016 | Laroia et al. |
| 2016/0309133 A1 | 10/2016 | Laroia et al. |
| 2016/0316117 A1 | 10/2016 | Singh et al. |
| 2016/0360109 A1 | 12/2016 | Laroia et al. |
| 2016/0381301 A1 | 12/2016 | Shroff |
| 2017/0031138 A1 | 2/2017 | Laroia |
| 2017/0041528 A1 | 2/2017 | Lai et al. |
| 2017/0054919 A1 | 2/2017 | Laroia |
| 2017/0059857 A1 | 3/2017 | Laroia et al. |
| 2017/0070683 A1 | 3/2017 | Laroia |
| 2017/0099439 A1 | 4/2017 | Pulli et al. |
| 2017/0123189 A1 | 5/2017 | Laroia |
| 2017/0126976 A1 | 5/2017 | Laroia |
| 2017/0180615 A1 | 6/2017 | Lautenbach |
| 2017/0180637 A1 | 6/2017 | Lautenbach et al. |
| 2017/0201699 A1 | 7/2017 | Laroia |
| 2017/0208230 A1 | 7/2017 | Laroia |
| 2017/0208257 A1 | 7/2017 | Laroia |
| 2017/0223286 A1 | 8/2017 | Laroia et al. |
| 2017/0280135 A1 | 9/2017 | Shroff et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |
| WO | 2009145401 A1 | 12/2009 |
| WO | 2012089895 A1 | 7/2012 |

OTHER PUBLICATIONS

Robertson, M et al "Dynamic Range Improvement Through Multiple Exposures". 1999. [online] [retrieved on Apr. 16, 2014]:<URL:http//ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

Notification Concerning Transmittal of International Preliminary Report on Patentability including International Preliminary Report on Patentability and Written Opinion of the International Searching Authority from PCT/US2016/028011, dated Oct. 26, 2017, pp. 1-6.

* cited by examiner

1100

MAXIMUM EXPECTED FREQUENCY (MF) CORRESPONDING TO DIFFERENT CAMERA MODULES

| DEPTH (1101) | CAMERA MODULE 1 (1102) | CAMERA MODULE 2 (1104) | CAMERA MODULE 3 (1106) | ... | CAMERA MODULE X (1110) |
|---|---|---|---|---|---|
| D1 (1120) | $MF_{D1CM1}$ | $MF_{D1CM2}$ | $MF_{D1CM3}$ | | $MF_{D1CMX}$ |
| D2 (1122) | $MF_{D2CM1}$ | $MF_{D2CM2}$ | $MF_{D2CM3}$ | | $MF_{D2CMX}$ |
| D3 (1124) | $MF_{D3CM1}$ | $MF_{D3CM2}$ | $MF_{D3CM3}$ | | $MF_{D3CMX}$ |
| D4 (1126) | $MF_{D4CM1}$ | $MF_{D4CM2}$ | $MF_{D4CM3}$ | | $MF_{D4CMX}$ |
| ⋮ | ⋮ | | ⋮ | | |
| DN (1130) | $MF_{DNCM1}$ | $MF_{DNCM2}$ | $MF_{DNCM3}$ | ... | $MF_{DNCMX}$ |

1140
CM1: CAMERA MODULE 1
CM2: CAMERA MODULE 2
⋮
CM X: CAMERA MODULE X
MF: MAXIMUM EXPECTED FREQUENCY
D: DEPTH
LEGEND

FIGURE 11

METHODS AND APPARATUS FOR REDUCING NOISE IN IMAGES

RELATED APPLICATIONS

The present application claims the benefit of U.S. Provisional Application Ser. No. 62/149,498 filed Apr. 17, 2015 which is hereby expressly incorporated by reference in its entirety.

FIELD

The present application relates to image capture and generation methods and apparatus and, more particularly, to methods and apparatus related to reducing and/or eliminating noise in one or more images or portions of images.

BACKGROUND

Presence of noise is an inevitable part of image capturing. In the context of imaging and photography, noise refers to unwanted/undesirable spurious and extraneous information in the form of high frequency components present in an image. The manifestation of image noise due to the presence of high frequency components in out of focus regions of the image is rather more perceptually annoying and appears totally out of place.

This noise is introduced in the image by various components of the imaging system including optics, sensor, and post capture image processing. The process of creating an image with reduced amount of noise is termed as the denoising which has been a significant problem for last few decades and has attracted significant attention from both the academia and the industry. A major challenge in denoising process is determining whether the actual differences in pixel values constitute noise or real photographic/image details owing to the fact that both noise and image details are high frequency.

Many existing solutions for image denoising rely on either using (a) single image, or (b) multiple images. At an abstract level, multi-image solution first aligns the images and then takes a weighted average of the images. On the other hand, solutions using single image rely largely on filtering the images. While the filters are designed to adaptively smooth the images while trying to preserve the image details, these filters still lead to the loss of image details due to the image details being filtered out in addition to the noise.

In view of the above discussion it should be appreciated that there exist a need for improved methods and apparatus for removing and/or reducing image noise.

SUMMARY

Various features relating to reducing and/or eliminating noise from images are described. In some embodiments depth based denoising is applied to images captured by one or more camera modules based on depth information of a scene area and optical characteristics of the one or more camera modules used to captures the images.

In accordance with one aspect of some embodiments, by taking into consideration the optics of the camera module which captured an image portion and the depth of the object included in the image portion a maximum expected frequency can be determined and the image portion is then filtered to reduce or remove frequencies above the maximum expected frequency. In this way noise can be reduced or eliminated form image portions captured by one or more camera modules. The optical characteristic of different camera modules may be different and in some embodiments include, e.g., focal length, object distance lens setting, aperture setting, pixel size of sensor etc. In some embodiments a maximum expected frequency is determined on a per camera module and depth basis. Thus in some embodiments maximum expected frequencies are generated for each camera module and depth in a depth map for a scene area. The images corresponding to the scene area or a portion of the scene area are captured by two or more camera modules in some embodiments.

In some embodiments filtering in accordance with the invention is applied on image portions captured by different camera modules which may be combined to form a filtered composite image or which may be included in a received composite image which is filtered taking into consideration which camera module an image portion corresponds to and the depth to which the image portion corresponds.

An exemplary method of generating an image, in accordance with an exemplary embodiment comprises: determine a first plurality of maximum expected frequencies, each of the first plurality of maximum expected frequencies corresponding to a first camera module and a different depth, said first plurality of maximum expected frequencies including a first maximum expected frequency corresponding to said first camera module and a first depth and a second maximum expected frequency corresponding to the first camera module and a second depth, receiving portions of a first image captured by said first camera module; and performing first filtering on individual portions of said first image captured by said first camera module based on a depth to which each individual portion corresponds.

While various features and embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 11 illustrates an exemplary table showing different maximum expected frequencies corresponding to different camera modules and depths, in accordance with some embodiments.

DETAILED DESCRIPTION

Figure 1:
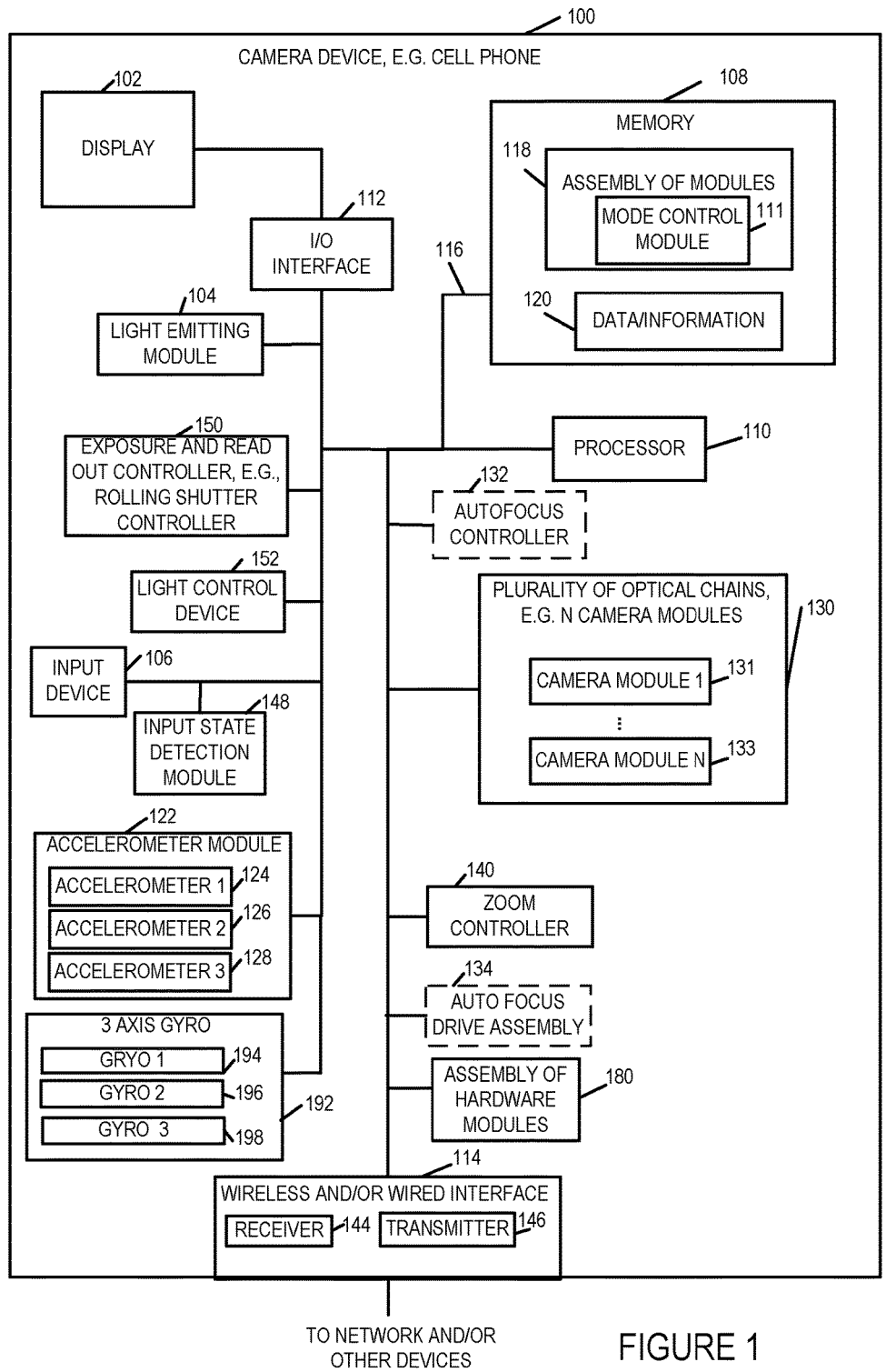
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140, to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 7A:
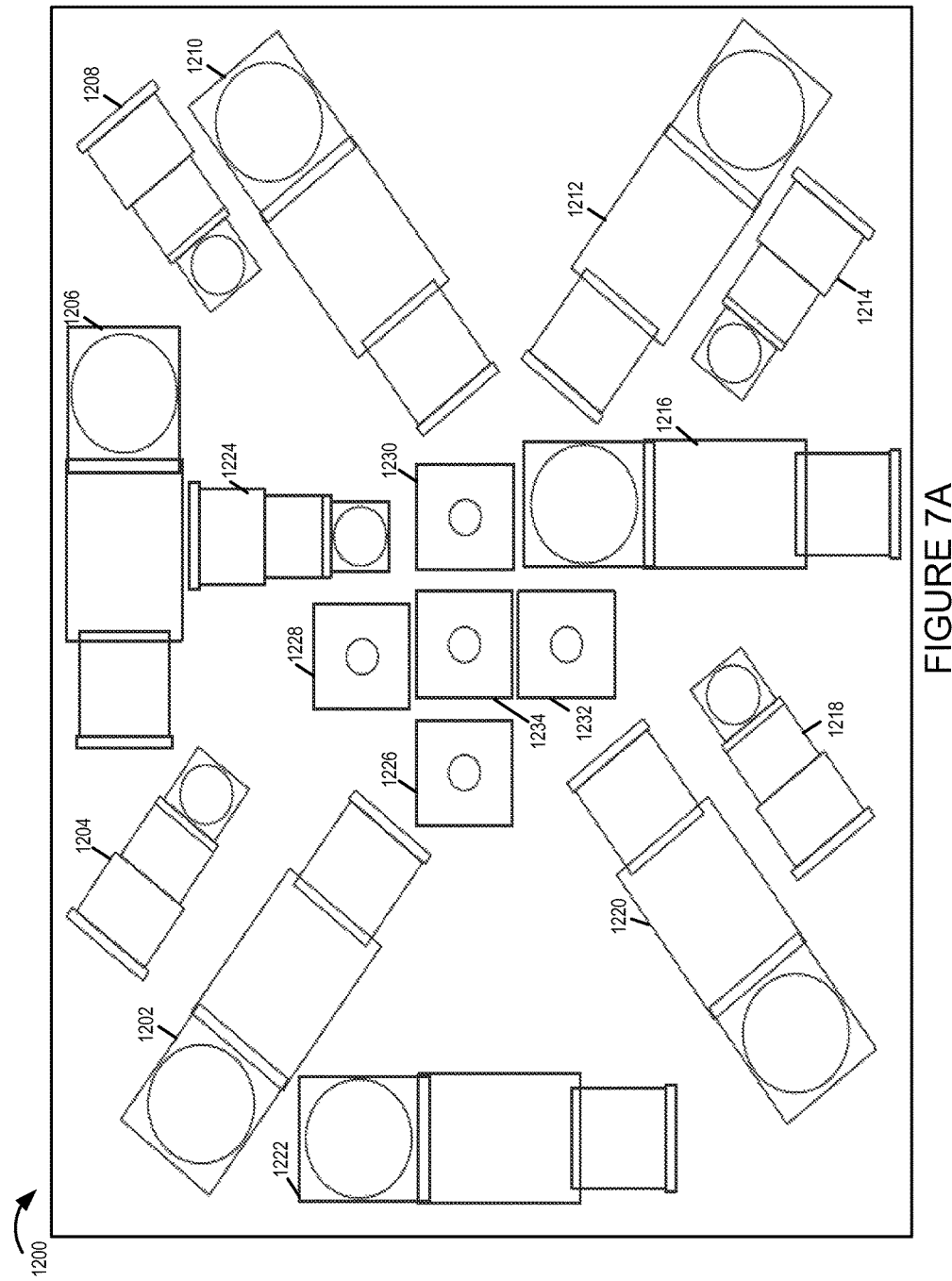
FIG. 7A illustrates an arrangement of optical chains, e.g., camera modules, used in one embodiment to implement a camera device of the type shown in FIG. 6A with the lens arrangement shown in FIG. 6B.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108. The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor may be a dedicated processor that is preconfigured to implement the methods of the present invention. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 (discussed in detail later with regard to FIG. 19) wherein one or more modules include one or more software routines, e.g., machine executable instructions, for implementing the image capture, image generation and/or image data processing methods of the present invention. Individual steps and/or lines of code in the modules of 118 when executed by the processor 110 control the processor 110 to perform steps of the method of the invention, e.g., generating depth map, determining maximum expected frequencies and/or filtering image portions, in accordance with the invention. When executed by processor 110, the assembly of modules 118 cause at least some data to be processed by the processor 110 in accordance with the method of the present invention, e.g., filtering image portions in accordance with the invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules 180.

The resulting data and information (e.g., captured images of a scene, combined or composite images of a scene, filtered images etc.) are stored in data/information block 120 for future use, additional processing, and/or output, e.g., to display device 102 for display or to another device for transmission, processing and/or display. In some embodiments the data/information block 120 further includes optical chain information, e.g., optical characteristics, corresponding to the plurality of optical chains 130 in the device 100. If one or more parameters/settings in the optical characteristics of a camera module changes then the corresponding optical chain information stored in the data/information 120 is updated. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
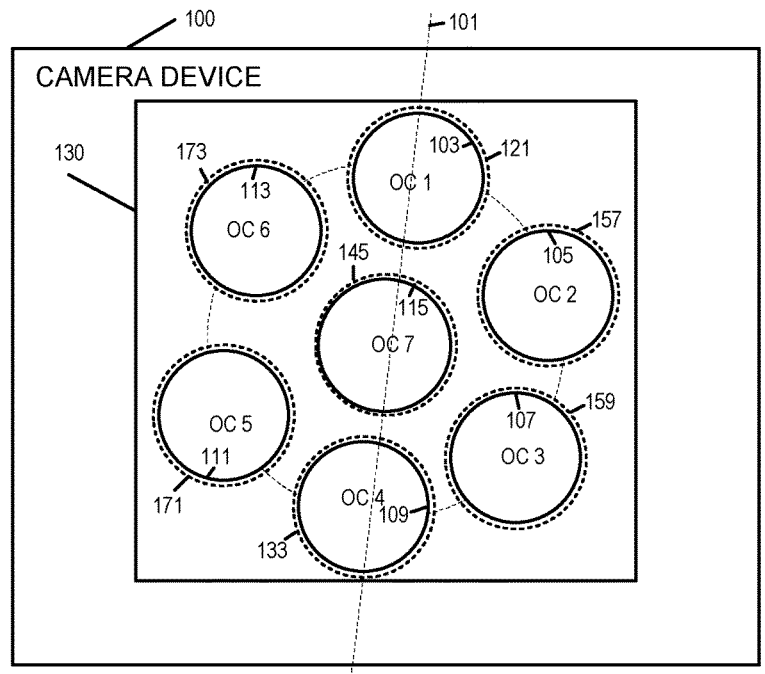
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
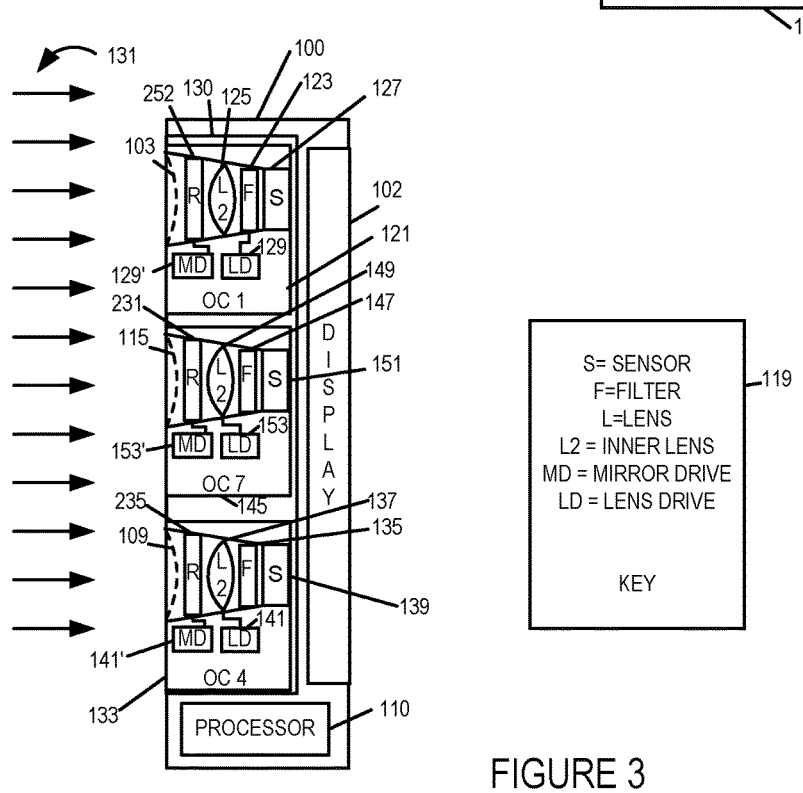
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 shows optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

Figure 7B:
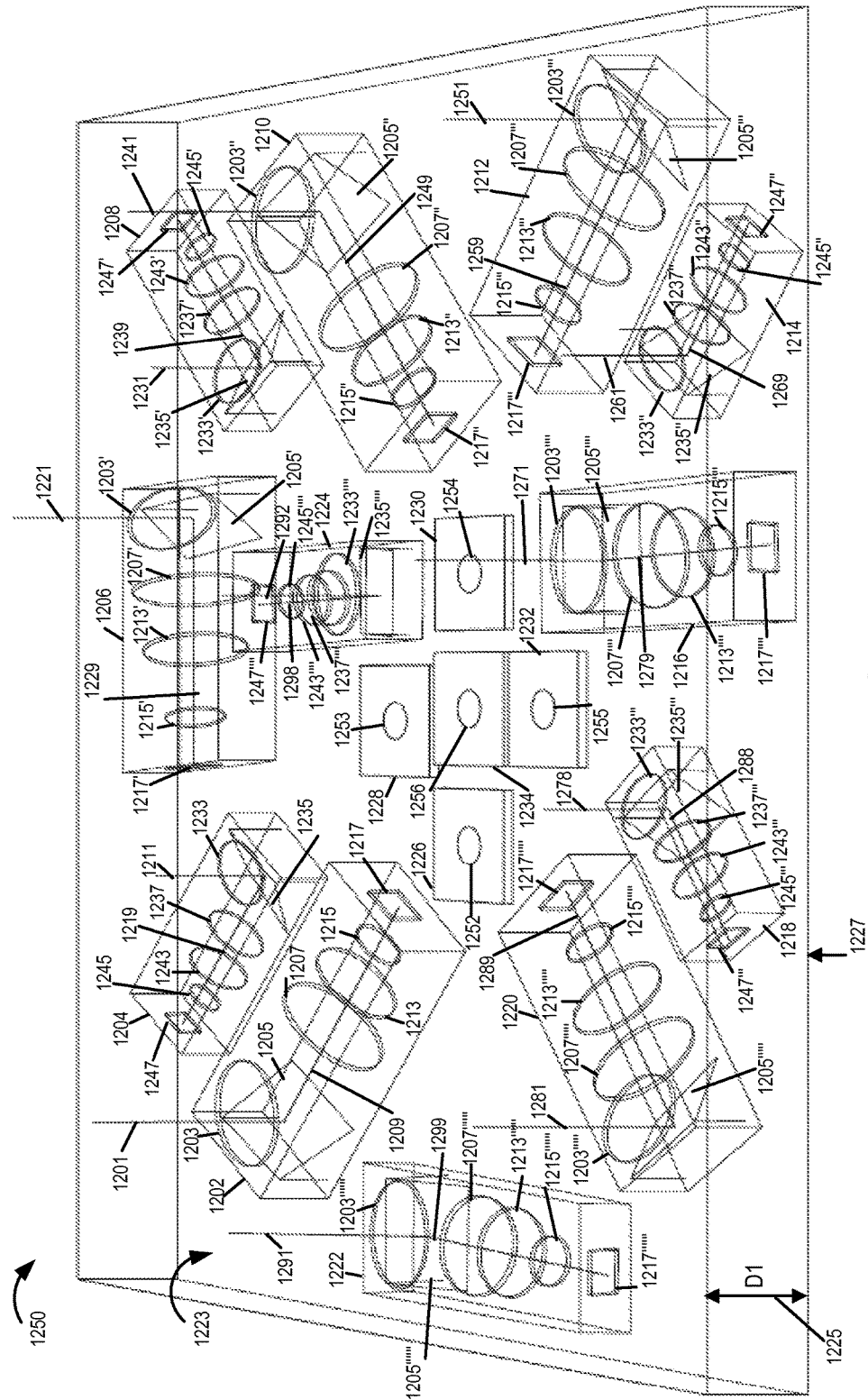
FIG. 7B illustrates a perspective view of a camera device of the type shown in FIG. 6, with the arrangement of various optical chains and elements of the optical chains in the camera device shown in greater detail.

While seven optical chains are shown in FIG. 2, it should be appreciated that other numbers of optical chains are possible. For example, as shown in FIGS. 7A and 7B seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., 1/5th, 1/10th, 1/20th or even less than the overall side to side length or even top to bottom length of the camera device visible in FIG. 2.

Figure 4A:
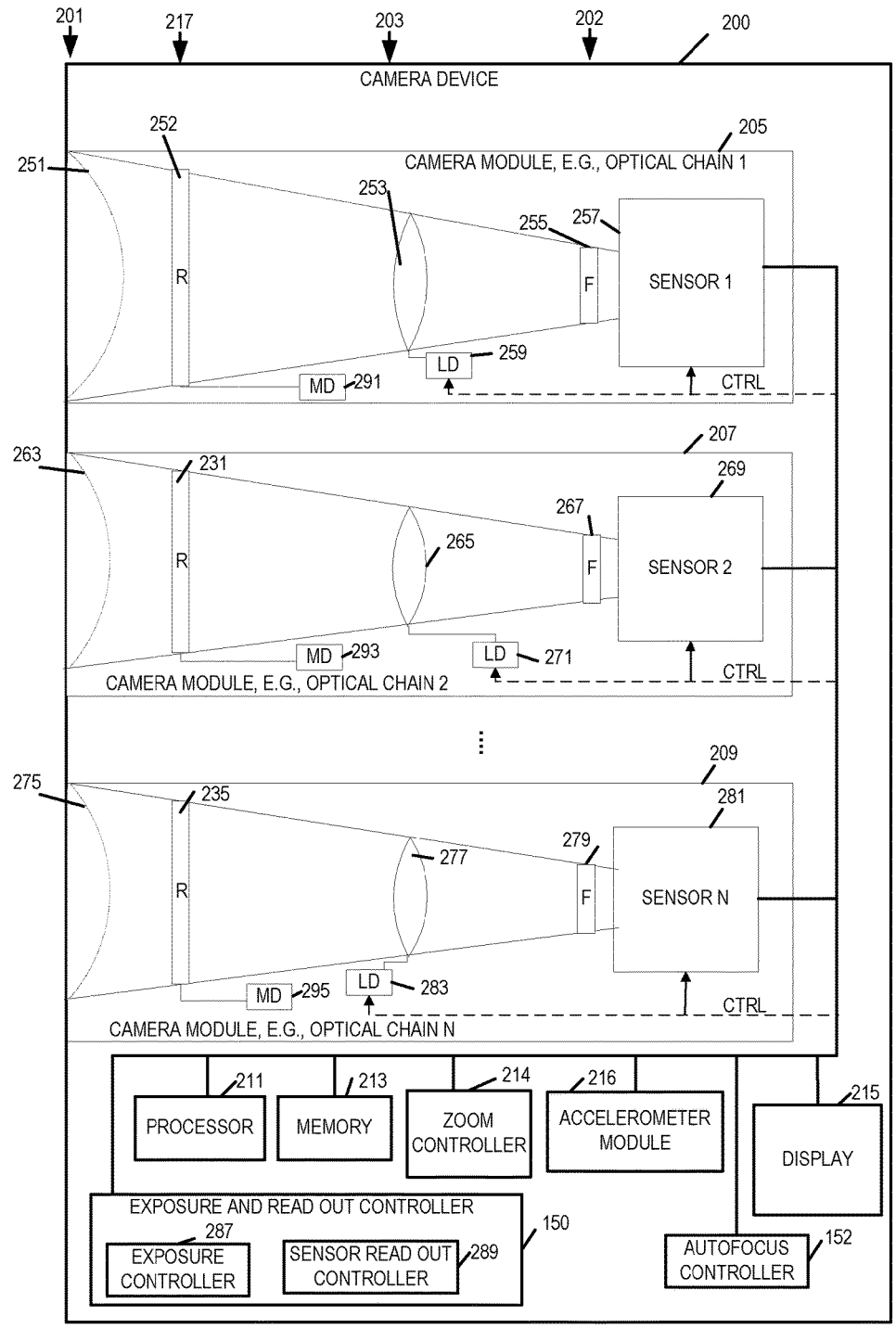
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
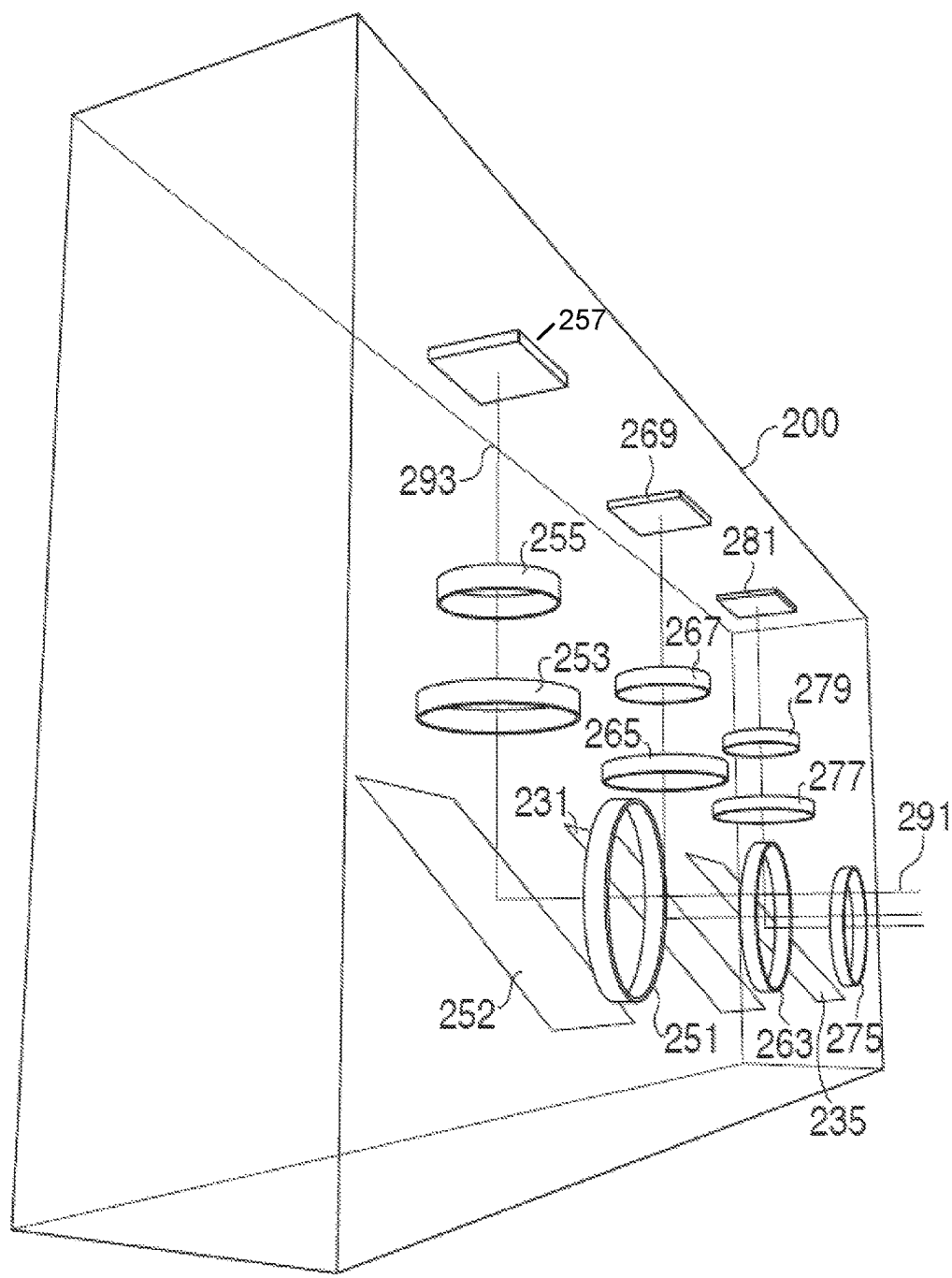
FIG. 4B illustrates the optical chains of the camera device shown in FIG. 4A, as implemented in one particular exemplary embodiment, in greater detail.
Figure 5:
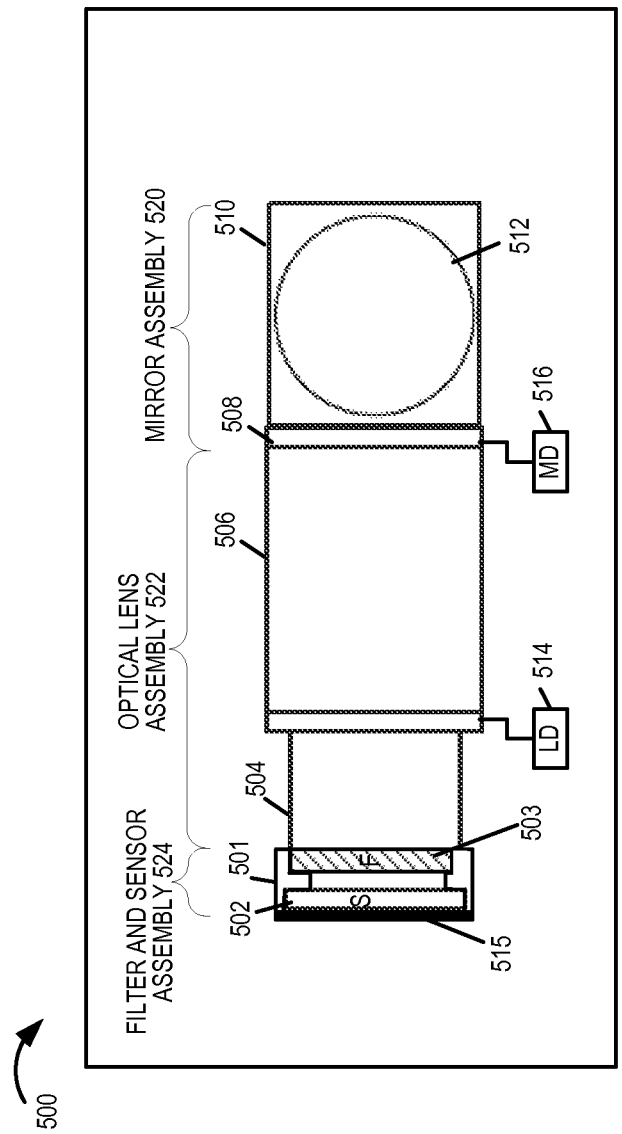
FIG. 5 illustrates an exemplary optical chain, e.g., camera module, which may be used as one of the optical chains included in the camera device of FIG. 1, FIG. 6, FIG. 7 or various other embodiments.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 are used in a camera device such as camera 600 discussed in detail below. The camera module 500 is an optical chain that includes an assembly of different elements integrated together to form the camera module. As illustrated, camera module 500 includes a mirror assembly 520, an optical lens assembly 522 and a filter and sensor assembly 524. The mirror assembly 520 of the camera module 500 includes an outer opening 512 which maybe covered by a flat glass/plastic plate, a light redirection device, e.g., mirror, 510 positioned behind the opening 512, and a mirror hinge 508. The mirror hinge 508 is coupled to the mirror drive (MD) 516. The optical elements assembly 522 of the camera module 500 includes a first cylindrical module portion 506 and a second cylindrical module portion 504, with the optical elements assembly 522 being coupled to a lens drive 514. The filter and sensor assembly 524 of the camera module 500 includes a filter mounted on a filter mount 501 and a sensor 502 placed on a mounting board 515. Light enters the optical chain 500 via the opening 512 and is redirected by the mirror 510 so that it reaches the sensor 502 at the back of the optical chain. The first and second cylindrical portions 504, 506 can house one or more lenses and in some cases filters as well as other optical components through which light may pass before reaching the sensor 502. While the mirror 510 is normally used to redirect light 90 degrees so that light entering through the opening 512 (which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the mirror drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510. In some embodiments, the axis of the hinge is perpendicular to the Part B of the optical axis and parallel to the place of the front face of the camera 600. In some embodiments, the opening 512 is covered with a plane glass with no optical power.

The MD 516 may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 of the optical elements assembly 522 may be moved by lens drive 514 so that they slide relative to each other, e.g., barrel portion 504 may be moved so that it moves further into or out of the barrel portion 506 thereby altering the distance from the opening 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

Figure 6A:
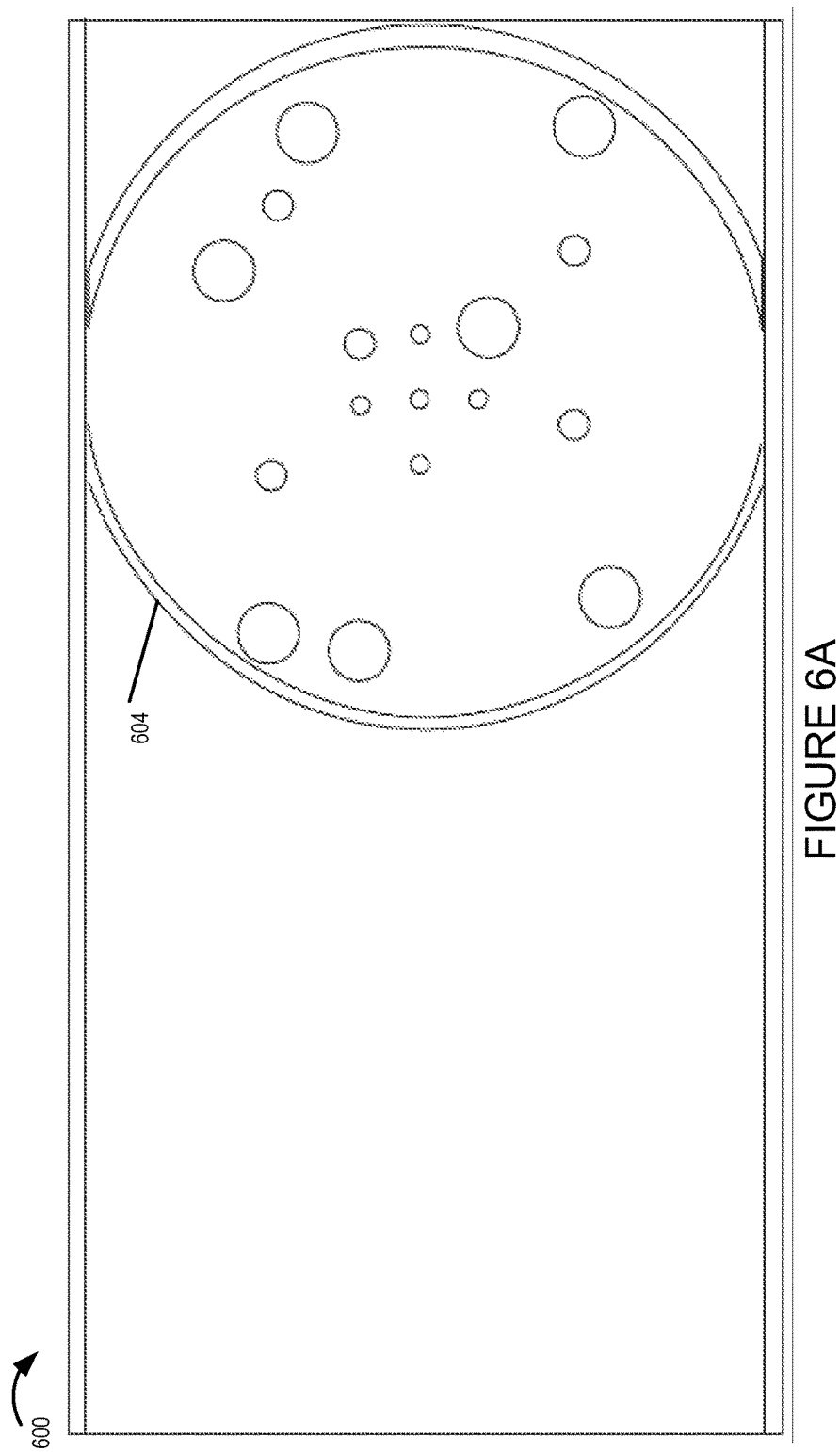
FIG. 6A is an illustration of an exemplary camera including multiple optical chains in accordance with one feature of the invention showing the arrangement of the lenses of individual camera modules

FIG. 6A is a frontal view of the camera device 600 and the optical chain arrangement of the camera device with the 15 outer openings being clearly visible as circles in the lens area 604. Note that the diameter of the smallest lenses is "d" which corresponds to the camera modules having the smallest focal length, the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 6B:
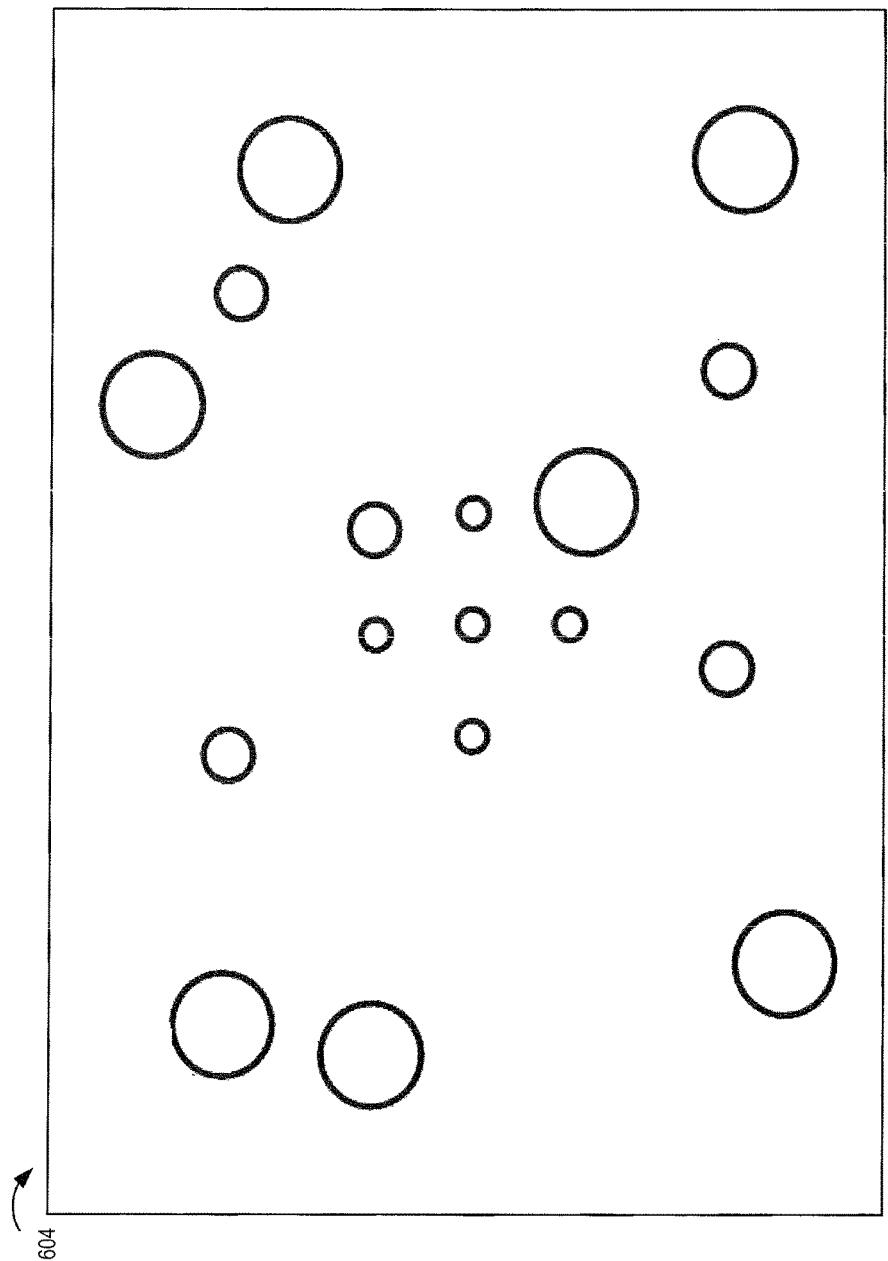
FIG. 6B illustrates the arrangement of lenses of individual optical chains in the camera device shown in FIG. 6A allowing for better appreciation of the arrangement of lenses on the front of the camera device.

FIG. 6B shows an enlarged version of the optical chain arrangement of the camera 600 as viewed from the front. In FIG. 6B the outer openings of the three different sizes can be clearly seen with the largest diameter openings corresponding to camera modules having the largest focal length and thus zoom, e.g., magnification.

FIG. 7A is a diagram 1200 showing how the 17 optical chains, e.g., camera modules, of the camera 600 can be arranged within the body of the camera 600. The seven optical chains 1202, 1206, 1210, 1212, 1216 1220, 1222 with the largest lenses and largest supported focal lengths are implemented using optical chains of the type shown in FIG. 5. Similarly, the five camera modules 1204, 1208, 1214, 1218, 1224 with the medium diameter lenses and medium supported focal lengths are also implemented using optical chains of the type shown in FIG. 5. The five optical chains 1226, 1228, 1230, 1232 and 1234 having the smallest diameter outer openings, e.g., light entrance openings, and smallest focal lengths are implemented using optical chains which do not use mirrors and extend straight toward the back of the camera. Optical chains of the type used in the FIG. 3 embodiment may be used for the optical chains 1226, 1228, 1230, 1232 and 1234. However, it should be appreciated that optical chains of the type illustrated in FIG. 5 maybe and in some embodiments are, used as the optical chains 1226, 1228, 1230, 1232 and 1234.

From the FIG. 7A example which may be considered as a frontal view with the front of the camera housing removed to allow viewing of the camera modules, it can be seen how a larger number of camera modules can be incorporated into a single camera device 600 allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 600.

FIG. 7B illustrates a perspective view 1250 of the camera device 600 showing the arrangement of various optical chains in the camera device and the elements of the optical chains in the camera device in greater detail. Thus FIG. 7B presents a more detailed illustration of the plurality of optical chains (OCs) 1202, 1204, 1206, 1208, 1210, 1212, 1214, 1216, 1218, 1220, 1222, 1224, 1226, 1228, 1230, 1232 and 1234 having various corresponding focal lengths as discussed with regard to FIG. 7A in detail.

As illustrated in FIG. 7B, the camera 600 has a depth D1 which represents the thickness of the camera 600 from the front surface of the camera (indicated by arrow 1223) to the back/rear surface of the camera (indicated by arrow 1227). While not shown in the FIG. 7B in some embodiments the camera device 600 includes the same or similar elements as the camera device of FIGS. 1 and/or 4A.

In some embodiments the elements included in the optical chains 1202, 1206, 1210, 1212, 1216, 1220, 1222, 1204, 1208, 1214, 1218, 1224 are similar to those discussed above with regard to FIGS. 4B and 5 while the elements included in the optical chains 1226, 1228, 1230, 1232 and 1234 are similar to those discussed above with regard to FIG. 3. In the embodiment of FIG. 7B each OC uses a round outer opening.

The OC 1202 includes an outer opening 1203, a light redirection device 1205, e.g., mirror, positioned behind the opening 1203, a first inner lens 1207, a second inner lens 1213, a filter 1215 and a sensor 1217. As discussed earlier in some embodiments the outer opening is covered by a flat glass plate or a flat plastic element. In some embodiments the OCs 1202, 1206, 1210, 1212, 1216, 1220, 1222 have the same focal length (largest focal length compared to other OCs in FIG. 7B) and use similar elements such as the mirror, filter, sensor etc. Accordingly, the elements corresponding to OCs 1206, 1210, 1212, 1216, 1220, 1222 have been identified using the same reference numerals used for identifying similar elements in the OC 1202 but with the reference numbers in these OCs followed by a prime ('), double prime ("), triple prime ("') etc. For example, OC 1206 includes an outer opening 1203', a light redirection device 1205', e.g., mirror, positioned behind the opening 1203', a first inner lens 1207', a second inner lens 1213', a filter 1215', and a sensor 1217'. The OC 1210 includes an outer opening 1203", a light redirection device 1205", a first inner lens 1207", a second inner lens 1213", a filter 1215", and a sensor 1217". The OC 1212 includes an outer opening 1203''', a light redirection device 1205''', a first inner lens 1207''', a second inner lens 1213''', a filter 1215''', and a sensor 1217'''. The OC 1216 includes an outer opening 1203'''', a light redirection device 1205'''', a first inner lens 1207'''', a second inner lens 1213'''', a filter 1215'''', and a sensor 1217''''. The OC 1220 includes an outer opening 1203''''', a light redirection device 1205''''', a first inner lens 1207''''', a second inner lens 1213''''', a filter 1215''''', and a sensor 1217'''''. The OC 1222 includes an outer opening 1203'''''', a light redirection device 1205'''''', a first inner lens 1207'''''', a second inner lens 1213'''''', a filter 1215'''''', and a sensor 1217''''''.

Similarly the elements corresponding to OCs 1204, 1208, 1214, 1218, 1224 which have the same focal lengths (intermediate) have been identified using the same reference numerals. The OC 1204 includes an outer opening 1233, a light redirection device 1235, e.g., mirror, positioned behind the opening 1233, a first inner lens 1237, a second inner lens 1243, a filter 1245, and a sensor 1247. Optical chain 1208 includes an outer opening 1233', a light redirection device 1235', e.g., mirror, positioned behind the opening 1233', a first inner lens 1237', a second inner lens 1243', a filter 1245', and a sensor 1247'. OC 1214 includes an outer opening 1233", a light redirection device 1235", a first inner lens 1237", a second inner lens 1243", a filter 1245", and a sensor 1247". OC 1218 includes an outer opening 1233''', a light redirection device 1235''', a first inner lens 1237''', a second inner lens 1243''', a filter 1245''', and a sensor 1247''' and the OC 1224 includes an outer opening 1233'''', a light redirection device 1235'''', a first inner lens 1237'''', a second inner lens 1243'''', a filter 1245'''', and a sensor 1247''''.

As discussed with regard to FIG. 4B, an optical chain such as the optical chain 1202 (or OCs 1206, 1210, 1212, 1216, 1220, 1222, 1204, 1208, 1214, 1218, 1224), that has a light redirection element, such as the element 1205, can be divided, for purposes of discussion, into two parts. The optical axis of the optical chain 1202 as seen from outside of the front of the camera is the optical axis of a first part 1201 (entering the OC from the front 1223 of the camera 600 via the outer opening 1203). Light traveling into the optical chain 1202 along the optical axis is redirected by the redirection element 1205 and traverses a second part 1209 of the first optical chain and reaches the sensor 1217. Similarly, the optical axis of the optical chain 1204 includes a first part 1211 and a second part 1219 after light redirection by the redirection element 1235, the optical axis of the optical chain 1206 includes a first part 1221 and a second part 1229, the optical axis of the optical chain 1208 includes a first part 1231 and a second part 1239, the optical axis of the optical chain 1210 includes a first part 1241 and a second part 1249, the optical axis of the optical chain 1212 includes a first part 1251 and a second part 1259, the optical axis of the optical chain 1214 includes a first part 1261 and a second part 1269, the optical axis of the optical chain 1216 includes a first part 1271 and a second part 1279, the optical axis of the optical chain 1218 includes a first part 1278 and a second part 1288, the optical axis of the optical chain 1220 includes a first part 1281 and a second part 1289, the optical axis of the optical chain 1222 includes a first part 1291 and a second part 1299, and the optical axis of the optical chain 1224 includes a first part 1292 and a second part 1298.

The other optical chains OCs 1226, 1228, 1230, 1232 and 1234 (smallest focal length OCs) while each having an outermost opening 1252, 1253, 1254, 1255, and 1256 respectively through which light enters, the OCs 1226, 1228, 1230, 1232 and 1234 do not have light redirection elements in the FIG. 7B example. While not shown in FIG. 7B the OCs 1226, 1228, 1230, 1232 and 1234 each has an optical axis which is perpendicular to the front face 1223 of the camera 600.

The function of the various elements of an OC such as the outer openings, inner lenses, mirror, filters and sensors, has been discussed earlier, for example in the discussion of FIGS. 4B and 5. Since the function of the elements of the OCs shown in FIG. 7B is the same or similar to that discussed with regard to FIGS. 4A-4B and 5, the discussion will not be repeated.

Light enters each of the OCs 1202, 1206, 1210, 1212, 1216, 1220, 1222, 1204, 1208, 1214, 1218, 1224 via their respective outer opening and is redirected by their respective redirection elements so that it reaches the respective sensors at the back of each of the optical chains. In many cases the outer opening through which the light enters the OC is referred to as the entrance pupil via which the light enters. For example, light entering through outer opening 1203 of the optical chain 1202 (e.g., from the front 1223 of the camera 600 as indicated by the first optical axis 1201) is redirected by mirror 1205 so that it passes through the first inner lens 1207, the second inner lens 1215 and the filter 1213 as it travels towards sensor 1217. More or less number of elements, e.g., lenses, filters etc., may be included in each of the OCs in some embodiments. Different optical chains may use different lenses while still using a sensor of the same shape and/or resolution as the other optical chains in the camera device 600.

It should be appreciated that the light redirection elements, e.g., such as a hinged mirror or other light redirection device such as a prism, positioned behind the entrance pupil or opening of an OC can be moved and/or rotated which results in changing of the optical axis of the OC seen from outside the outer openings of the corresponding OC. That is the optical axis of an optical chain as seen from outside the camera (discussed above as the optical axis of a first part such as optical axes 1201, 1211, 1231 etc.) can be changed by controlling the light redirection elements of the corresponding OC. Thus it should be appreciated that while in FIG. 7B example the optical axes 1201, 1211, 1221, 1231, . . . 1298, 1299 appear to be parallel, in some embodiments by controlling the light redirection element such as the mirror placed behind the outer opening in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

In some embodiments the camera 600 includes a processor (e.g., processor 110, 211) configured to generate a composite image by combining at least a first and a second image. In some embodiments the processor is configured to generate the composite image from first, second, third, fourth, fifth and sixth images. In some embodiments the processor is configured to generate the composite image from the first, second, third, fourth, fifth, sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

Figure 8:
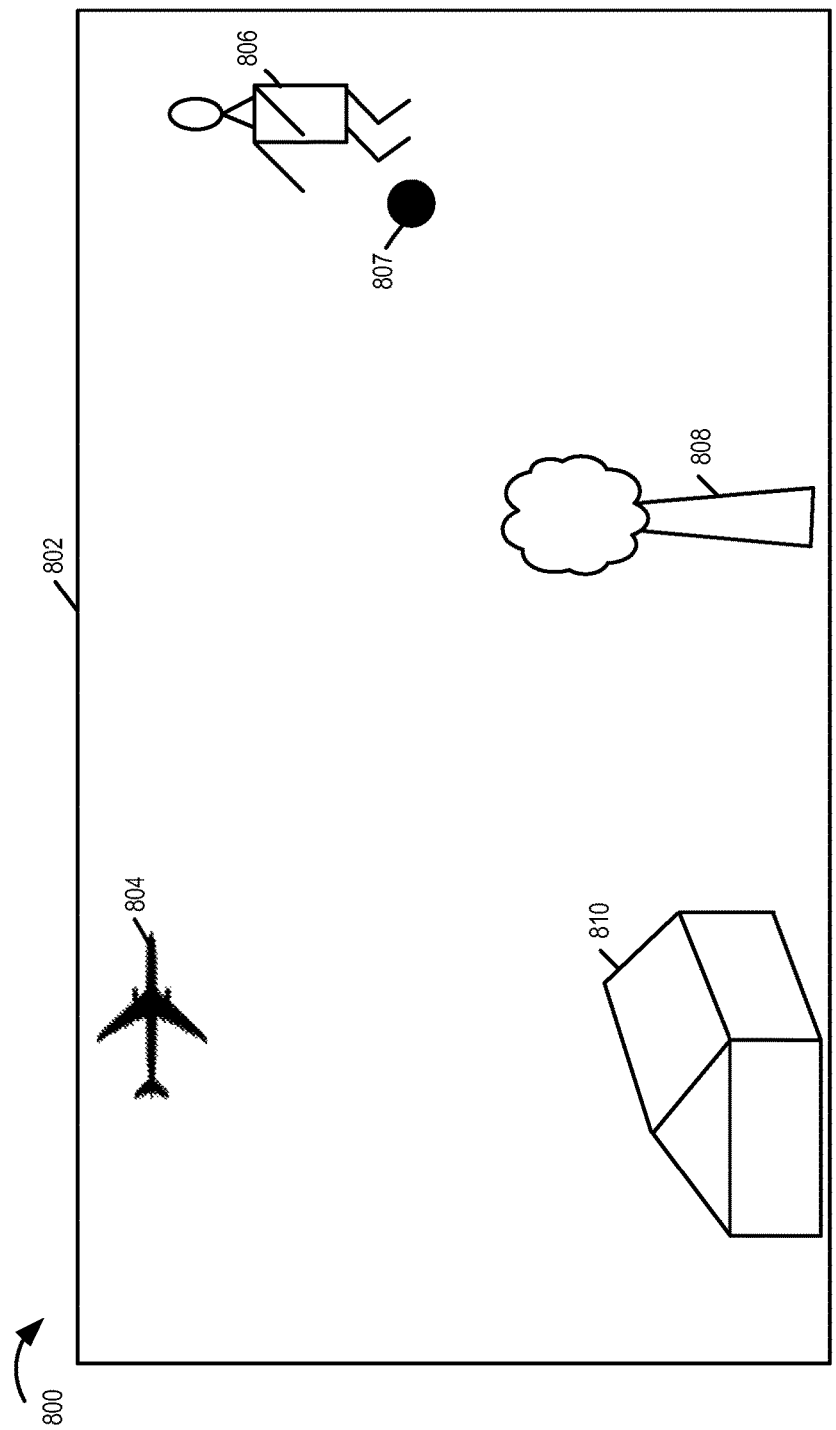
FIG. 8 shows an exemplary scene including a scene area which may have its image captured by camera modules of a camera implemented in accordance with one or more embodiments of the invention.

FIG. 8 is a drawing 800 illustrating an exemplary scene area 802 which may have all or portions of its image captured by camera modules of a camera implemented in accordance with one or more embodiments of the invention. Scene area 802 includes multiple objects at least some of which are stationary while others are in motion. In the example, the scene area 802 includes an airplane 804, a person 806, a ball 807, a tree 808 and a house 808. Each of the objects in the scene 802 may have a different corresponding depth in the scene 802. In accordance with one aspect, depth information corresponding to the scene of interest 802 may be generated, e.g., using images corresponding to the portions of scene of interest captured by one or more camera modules and/or by using depth measurement equipment. The generated depth information, e.g., a 3D depth map, includes depths corresponding to the various objects in the scene 802. In the illustrated example, the scene area 802 maybe logically partitioned into various scene portions based on various depths in the depth map for the scene of interest 802. In the example consider that there are five different depths in the depth map corresponding to the scene of interest 802.

Figure 9:
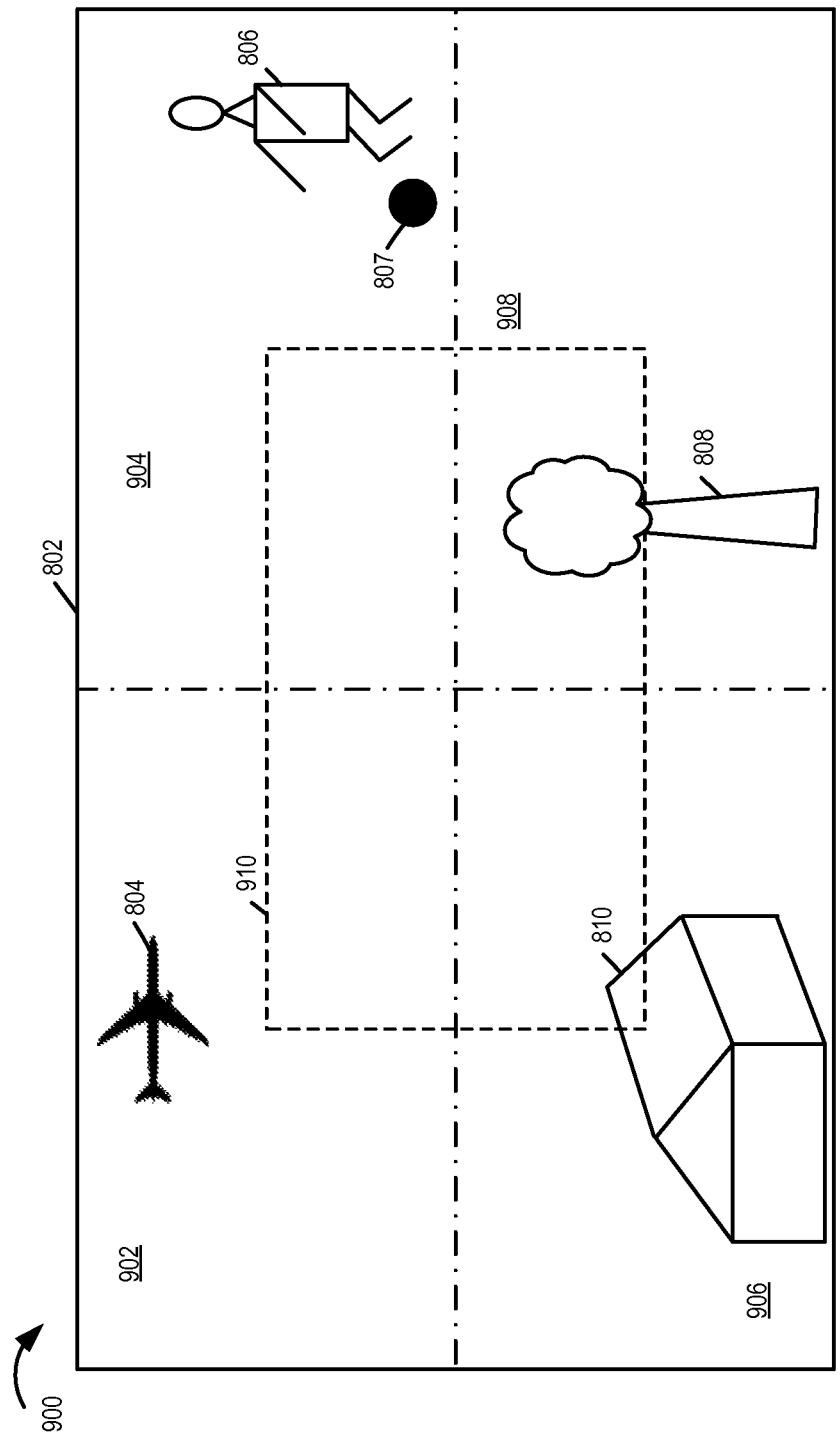
FIG. 9 shows how different camera modules of a camera including multiple camera modules may capture different portions of the scene area of interest shown in FIG. 8.

FIG. 9 is a drawing 900 illustrating conceptually how different optical chains, e.g., camera modules, of a camera, such as the camera device 600 of FIG. 6 which includes multiple optical chains (as shown in FIGS. 7A and 7B), some of which have different focal lengths can capture different size portions of a scene area 802. The different capture sizes corresponding to the various different camera modules correspond to field of view (FOV) of the respective camera modules in some embodiments.

For purposes of discussion, the capture and combining of images corresponding to different scene areas will be explained using the camera device 600 by referring to FIG. 7A which shows the arrangement of optical chains in camera 600. Consider for purposes of discussion that the camera device 600 includes the 17 modules arranged as shown in FIG. 7A. As previously discussed in the FIG. 7A example, three different focal lengths, f1, f2 and f3 are used where f1<f2<f3; f1 is ½ f2; and f2 is ½ f3.

For purposes of discussion the first through seventh camera modules 1202, 1206, 1210, 1212, 1216 1220, 1222, respectively, are the modules with the largest lenses (and thus largest apertures in various embodiments) and largest supported focal lengths (f3). For simplicity in the discussion below, it is further assumed that the distances between the various camera modules is much smaller than the distance between the camera and all the objects in the scene. This is however not a limitation of the described invention but meant only to make the explanation easier to follow.

The five medium sized camera modules which are the eighth through 12th camera modules correspond to reference numbers 1204, 1208, 1214, 1218, 1224, respectively and have medium diameter lenses and medium supported focal lengths (f2).

The five camera modules which are the 13th through 17th camera modules correspond to reference numbers 1226, 1228, 1230, 1230 and 1234 and have the smallest diameter lenses and smallest focal length (f1).

It should be appreciated that the camera modules with the largest focal length f3 will have a relatively smaller field of view in comparison to camera modules with smaller focal lengths and capture smaller portion of a scene area of interest given that they provide the greatest magnification. Assuming that camera modules of the different focal lengths use sensors with the same total pixel count, the modules with the larger focal length (f3) will provide an image with a higher pixel to scene area ratio since more pixels will be used to capture an image of a smaller scene area than will be the case with the medium (f2) and small focal length (f1) camera modules.

It should be appreciated that given the difference in magnification between the modules with different focal lengths (f1, f2, f3) the scene area captured by the small focal length (f1) camera modules will correspond to portion of the scene area of interest which is approximately 16 times the size of the portion the scene area of interest which is captured by the camera modules with the largest (f3) focal length. The portion of the scene area of interest captured by camera modules with the intermediate focal length (f2) will be 4 times the size of the portion of the scene area of interest captured by the camera modules with the largest focal length (f3) and ¼ the size of the portion of the scene area of interest captured by the camera modules with the smallest focal length (f1).

The relationship between the scene areas captured by camera modules corresponding to the f1 and f2 focal lengths can be appreciated in the context of the FIG. 9 example which shows 7 distinct scene areas. In some embodiments f=35 mm and f2=70 mm.

In the FIG. 9 example scene area of interest is identified by reference 802 as used in FIG. 8. The scene area 802 correspond to the full scene area of interest also shown in FIG. 8. For purposes of explanation consider that the scene area 802 is captured by optical chains having the focal length f1, i.e., by smaller focal length optical chains. Assume for discussion purposes that (f1) camera module 1228 is used to capture the scene area 802 represented by the largest rectangle in FIG. 9. Note that the actual image captured by 1228 may be of a slightly larger scene area to ensure that the scene area of interest is captured.

Further consider that f2 camera module 1204 is used to capture a second scene area 902 which is represented by the rectangle in the top left corner in FIG. 9, that (f2) camera module 1208 is used to capture a third scene area 904 represented by the rectangle in the top right corner in FIG. 9, that (f2) camera module 1218 is used to capture a fourth scene area 906 represented by the rectangle in the bottom left corner in FIG. 9, that (f2) camera module 1214 is used to capture a fifth scene area 908 represented by the rectangle in the bottom right corner in FIG. 9 and that (f2) camera module 1224 is used to capture sixth scene area 910 represented by the rectangle with dashed lines in the center portion. Again as with the capture of the other scene areas, the actual images captured by the modules 1204, 1208, 1218, 1214 and 1224 may be of slightly larger scene areas to ensure that the respective scene areas are fully contained in the captured images.

Note that the relative position of the outer openings of the camera modules shown in drawing 1200 are known and fixed in some embodiments. However, in some embodiments the modules 1204, 1208, 1218, 1214 and 1224 are the same or similar in there elements and function to the module 500 in FIG. 5 which includes a mirror 510 that can be driven, e.g., moved or rotated by the hinge (mirror) drive 516 to change the angle of the mirror 510. While the mirror drive 516 can rotate the mirror around the hinge axis and thus change its angle, the hinge 508 prevents motion in other directions and thus the optical axis (outside the camera) rotates in a plane perpendicular to the axis of the hinge. When the mirror 510 is at a 45 degree angle, the light entering the opening 512 along it's optical axis is deflected 90 degrees into the optical axis of Part B of the module 500. While we describe here a mirror 510 that is hinged and can rotate along an axis, in some other embodiments the place of the mirror is moved to a different plane such that this motion is not constrained to be rotation along any fixed axis. In this case the optical axis of the camera module can be made to point in any desired direction (towards any point in the scene of interest).

While some modules use mirror that are movable and hinged, in other embodiments one or more of the camera modules are implemented with fixed position mirrors allowing the moveable hinge 508 and mirror drive 516 to be omitted. For example, in one embodiment the camera modules used to capture the full scene area of interest have fixed mirrors while the camera modules used to capture small portions of the scene area of interest each include a movably hinged mirror. While combinations of camera modules with some having fixed mirrors and others having movable mirrors can be used, in at least one embodiment each of the multiple camera modules included in an exemplary camera device have movable mirrors.

The mirror/hinge drive 516 is controlled by the processor 110 depending on the particular mode of camera operation. Thus, when a user selects a first mode of operation one or more camera modules may have their mirrors at a first angle while during another mode of operation, e.g., a module in which images are to be captured and combined as shown in FIG. 34, one or more camera modules will have their mirror driven to a different position under control of the processor 110. The particular mode of camera device operation may be determined based on user input by the processor 110 operating under control of the mode control module 111 or directly by the mode control module 111 when the mode control module is implemented in hardware.

If mirrors in each of 1204, 1208, 1218, 1214 and 1224 are at 45 degrees, each module looks directly out of the front face of the camera and their optical axes are all parallel. In this case each of the modules will take an image of the same scene area, e.g., the scene area 910 of FIG. 9. To capture an image of the second scene area with module 1204, the hinged mirror 510 of module 1204 is adjusted so that the optical axis of camera module 1204 points towards the center of the second scene area 3206. Note that the module 1204 is positioned in the camera 1200 in such a manner that as the mirror is rotated/moved relative around the hinge, the location in the scene area of interest 802 that the optical axis points to moves along the diagonals of the rectangle 802. Similarly, the mirror for camera module 1214 is adjusted to capture the fifth scene area. Note that in FIGS. 7A and 7B, camera modules 1204, 1214 are arranged proximate, e.g., along or adjacent, one diagonal while camera modules 1208, 1218 are located proximate, e.g., along or adjacent, the other diagonal. Rotating the mirror in 1214, e.g., changing the angle and thus incline of the mirror, makes the module's optical axis move along the corresponding diagonal. Mirrors of modules 1208 and 1218 are similarly angled, e.g., rotated, to capture images of the other scene areas respectively. The module 1224 used to capture the sixth image area 910 points at the center of the scene area of interest 802 so it's mirror is maintained at 45 degrees.

It should be appreciated from the above discussion that it is particularly beneficial to have at least some camera modules arranged along diagonals. These modules have the Part B of their optical axis parallel to one of the two diagonals. Thus, the arrangement of modules 1210, 1220, 2202, 1212 with the largest apertures along diagonals and also the arrangement of medium aperture modules 1204, 1214, 1208, 1208 along the same diagonals but offset from the other modules for space reasons, is an intentional design choice because it facilitates image capture and combining in some embodiments and modes of operation.

Based on the overlapping scene areas, e.g., 3210 and 3204 a depth map is generated, e.g., by the processor included in the camera in some embodiments. In some embodiments the depth of an object in the scene can be determined by examining the relative positions of an object in the images captured by different modules. In at least some embodiments the depth map is used, e.g., in combination with information about the relative position of the outer opening of the different optical chains and/or optical axis of the optical chains in combining images captured by the different optical chains to form a composite image. The use of the depth information in the generation of the composite image allows for the correction of parallax, perspective and/or other image distortions that may occur or which are present in the images. While depth map may be generated using images captured by camera modules in some embodiments, in other embodiments a depth map may be generated using other techniques, e.g., using depth information generated using a depth sensing equipment and/or using LIDAR technique. Thus it should be appreciated that a depth map corresponding to a scene area may be obtained in a variety of ways.

In the FIG. 9 example, 6 distinct scene areas are shown for purposes of explaining the invention. Each of the 6 scene areas may be, and in some embodiments is, captured by a different optical chain of the camera device 600 shown in drawing 1200 prior to being combined. The camera modules, as will be discussed below, can capture images at the same time, e.g., in parallel. However, in some embodiments as will be discussed below where rolling shutters are used the camera modules are controlled to capture portions of the scene area of interest in a synchronized manner so that all the different camera modules which capture a given portion of a scene area of interest will capture the given portion at the same time.

It should be appreciated that by combining images corresponding to the different scene area portions shown in FIG. 9 to generate a composite image, it is possible to generate a composite image with four times the pixel count of a single image sensor. For example, if each of the image portions is captured by a camera module using an 8 mega pixel sensor, the composite image corresponding to the scene area of interest shown in FIG. 9 would have an overall pixel count of 32 megapixels since the second, third, fourth and fifth scene area would each be captured by a different 8 megapixel sensor and thus contribute 8 megapixels to the composite image. The actual resolution could be slightly lower if the captured images are slightly larger than the corresponding scene areas.

While the sensors used to capture the first and fourth scene areas are not likely to result in an increase in the overall pixel count of the composite image since they correspond to the same image area as that captured by the combination of sensors used to capture the second, third, fifth and sixth scene areas, they provide for increased light capture than would be possible without the use of the f1 lenses and also provide important information which allows for the generation a depth map and which provide images of the overall scene area which can be used in aligning and stitching together the images corresponding to the second, third, fifth and sixth scene areas as part of the process of generating the composite image.

In some embodiments the large focal length (f3) camera module, e.g., 1216, is used to capture the image of the center portion of the area of interest such that its center coincides with the center of the image area of interest. Since practically most lenses have the least aberrations and best image quality at the center of their field of view, this ensures that the center of the scene area of interest is imaged at high quality by the camera module of large focal length capturing center portion. The imaging of the scene area corresponding to the center portion of the scene of interest 802 also increases the total amount of light energy captured at the center of the scene area of interest. This allows the composite image generated from the captured images to have its best quality (high resolution and minimum noise) at the center of the scene area of interest.

FIG. 9 and the image portions, e.g., the scene areas, shown therein will be used in explaining how rolling shutters corresponding to different camera modules can be controlled in a coordinated manner to facilitate combining of images captured by different camera modules in a way that reduces or minimize motion related (camera or subject related) distortions that may be introduced if each of the camera module sensors were independently (asynchronously) operated to capture the image portions. The read out from the sensors of the camera modules in a coordinated manner helps in minimizing distortions due to uncoordinated asynchronous image capturing by different optical chains and the captured images can be combined easily.

The above discussed image capture operations performed by various sensors included in corresponding optical chains as discussed above may, and in some embodiments is, performed by a camera such as camera 600 including optical chains arranged as illustrated in FIGS. 7A and 7B.

Figure 10:
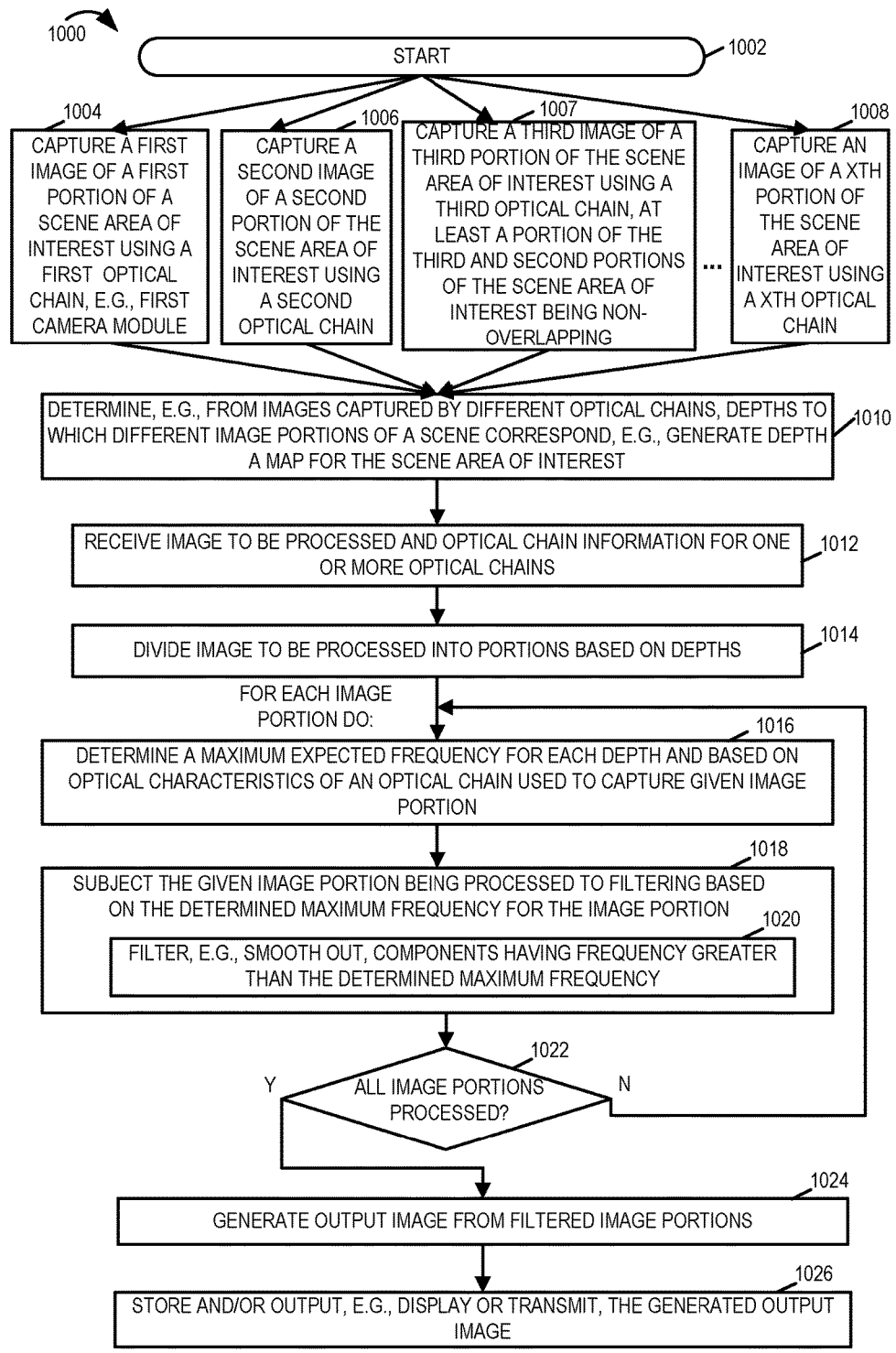
FIG. 10 shows a flowchart illustrating the steps of an exemplary method in accordance with an exemplary embodiment.

FIG. 10 illustrates a flowchart 1000 of an exemplary method of reducing and/or eliminating noise in an image in accordance with an exemplary embodiment. The exemplary method of flowchart 1000 can, and sometimes is, implemented by a camera device including the same or similar elements as the camera device 100 of FIG. 1 and device 200 of FIG. 4A. In some embodiments the camera device includes a plurality of optical chains, e.g., camera modules, such as the ones shown in FIGS. 7A and 7B, which can be operated and controlled independently and/or in a coordinated manner. The exemplary method starts in step 1002, e.g., when a user of a camera device, e.g., camera 100, presses a button or takes another action to trigger the capture of an image of a scene area of interest.

Operation proceeds from start step 1002 to step 1004. The operation also proceeds to steps 1006 and 1008 which are performed in parallel with step 1004 in an asynchronous manner. In these steps one or a plurality of optical chains, e.g., camera modules, are operated to capture images corresponding to a scene area of interest, e.g., scene 802. In step 1004 a first image of a first portion of the scene of interest is captured using a first camera module. In step 1006 a second image of a second portion of the scene of interest is captured using a second camera module. In step 1007 a third image of a third portion of the scene of interest is captured using a third camera module, at least a portion of the second and third portions of the scene area of interest being non-overlapping. In step 1008 an image of an Xth portion of the scene area is captured using an Xth camera module. In some embodiments five camera modules are used to capture various portions of the scene area of interest. In some embodiments the first camera module is e.g., camera module 1228 with the small focal length (f1) and the first image corresponds to the entire scene area of interest, e.g., the first portion of the scene area corresponds to the scene area of interest 802. For discussion purposes further consider that the second image corresponds to scene area 902, the third camera module is e.g., camera module 1208 with focal length (f2) and the third image corresponds to scene area 904 which is a portion of the scene area 802, the Xth camera module is e.g., camera module 1214 with focal length (f2) and the Xth portion of scene area corresponds to scene area 908.

Operation proceeds from image capture steps 1004, 1006, 1007, . . . , 1008 to step 1010. In step 1010 a depth map of the scene area of interest is generated, the depth map including depth information, e.g., depths, corresponding to objects in the scene area. While a depth map may be generated in a variety of ways, e.g., using depth sensor device and/or using images captured by camera modules, in FIG. 10 example step 1010 shows that the depth map is generated using images captured by different camera modules.

Operation proceeds from step 1010 to step 1012. In step 1012 image(s) to be processed is/are received, e.g., by a processing element that processes input image(s) in accordance with the invention. The received image(s) to be processed may be one or more of the captured images corresponding to the scene area of interest captured by the camera modules or a composite image generated by combining two or more images captured by the camera modules. Further in step 1012 optical chain information for one or more optical chains, e.g., camera modules used for capturing image or portions of image being processed, is received. The optical chain information includes optical chain characteristics and/or camera module settings for each of the camera module used to capture the image or portions of the image being processed. The optical characteristic of different camera modules may be different and in some embodiments include, e.g., focal length, object distance lens setting, aperture setting, pixel size of sensor etc.

Operation proceeds from step 1012 to step 1014. In step 1014 an image to be processed divided, e.g., partitioned, into portions based on depth information, e.g., depths in the generated depth map. Different portions of the image may correspond to different depths and accordingly the image is partitioned into different portions with each portion corresponding to a different depth. For example for a first image to be processed, in some embodiments step 1014 includes first determining the depths to which portions of first image correspond based on the depth map and then dividing the first image into portions based on the depths.

Operation proceeds from step 1014 to step 1016 which is performed on each portion of the input image (the input image been divided into portions based on depths). As discussed below in various embodiments steps 1016 and 1018 are performed for each portion of the image and repeated until all of the image portions corresponding to input image(s) are processed. In step 1016 a maximum expected frequency is determined, for a depth to which a given image portion corresponds and based on optical characteristics of the camera module used to capture the given image portion. For example for a first maximum expected frequency is determined for a first portion of the input image based on a first depth to which the first portion corresponds and based on optical characteristics of the camera module, e.g., first camera module, used to capture the first image portion.

Operation proceeds from step 1016 to step 1018. In step 1018 the image portion being processed is subject to filtering operation based on the determined maximum expected frequency for the image portion. In some embodiments filtering step 1018 includes step 1020 where the high frequency components in the image portion having frequency greater than the determined maximum expected frequency are filtered, e.g., smoothed out, thereby removing or reducing the noise content in the image portion.

Operation proceeds from step 1018 to step 1022 where a check is made to determined if all image portions of the input image have been processed. If all image portions have not been processed then the operation proceeds back to step 1016 and processing is performed on the next image portion, e.g., by performing processing as per steps 1016, 1018 and 1020 on the next image portion. The steps 1016, 1018 and 1020 are repeated until all image portions of the input image are processed. It should be appreciated that in some embodiments where step 1012 includes receiving multiple input images, e.g., images captured by the first, second, . . . Xth camera modules, processing is performed on each of the input images in the manner discussed in steps 1014, 1016, 1018 and 1020. In some embodiments when the input image in step 1012 is a composite image, the processing is performed on the composite image. If in step 1022 it is determined that all image portions of the input image have been processed, operation proceeds from step 1022 to step 1024.

In step 1024 an output image is generated from the filtered image portions thereby producing a filtered output image. In some embodiments where the filtered image portions correspond to a multiple different images captured by different camera modules, step 1024 includes generating a filtered composite image by combining filtered image portions. In some other embodiments where the filtered image portions already correspond to a composite image, e.g., in case where the input image (step 1012) was a composite image, the output image is the filtered composite image including the filtered image portions. This will become more clear when considered further in view of FIGS. 17-18 and the corresponding discussion later.

Operation proceeds from step 1024 to step 1026. In step 1026 the filtered composite image (including filtered image portions) is stored, transmitted to another device or displayed, e.g., on a display device.

FIG. 11 illustrates an exemplary table 1100 showing different maximum expected frequencies corresponding to different camera modules and depths, in accordance with some embodiments. The exemplary table 1100 in some embodiments is generated and stored after determination of sets of maximum expected frequencies corresponding to different depths in a depth map and camera modules. The table 1100 provides a simple example showing, for each camera module used to capture an image or portion of an image of a scene area, different maximum expected frequencies corresponding to different depths in a depth map of the scene area. In accordance with one aspect of some embodiments a depth map for a scene area captured by one or more camera modules, e.g., scene area 802, is generated which includes a plurality of depths, e.g., corresponding to different portions of the scene area. In accordance with one aspect, for each given camera module for which optical settings are known and which is used for capturing an image or a portion of the image of the scene area, a maximum expected frequency can be determined corresponding to each depth in the depth map. Thus in some embodiments corresponding to each depth a maximum expected frequency is determined for each camera module. The maximum expected frequency corresponding to a given depth indicates the maximum amount of high frequency components present in the neighborhood of a pixel or group of pixels to which the depth corresponds. In accordance with the features of the present invention, by determining the maximum expected frequencies corresponding to different depths, a filter can be designed to perform filtering operation on one or more portions of an image to remove or reduce high frequency components in the image portions which are above the maximum expected frequency.

In table 1100 each entry in column 1101 indicates a different depth in an exemplary depth map, with each of the rows 1120, 1122, . . . , 1130 corresponding to an individual depth indicated in column 1102. Thus row 1120 corresponds to depth D1, row 1122 corresponds to depth D2, . . . , and row 1130 corresponds to depth DN.

Each of the columns 1102, 1104, 1106, . . . , 1110 corresponds a camera module indicated in the top most entry of each of the column. Thus column 1102 corresponds to a camera module 1 (CM1), column 1104 corresponds to a camera module 2 (CM2), column 1106 corresponds to a camera module 3 (CM3), . . . , column 1110 corresponds to a camera module X (CMX). Each entry in the columns 1102, 1104, 1106, . . . , 1110 indicates, for the given camera module to which a column corresponds, a maximum expected frequency corresponding to a depth identified in the corresponding entry in column 1101 (and indicated by the corresponding row).

To clearly understand how to read information from exemplary table 1100, consider the first row 1120 corresponding to depth D1 and the first entry in each of the columns 1102, 1104, 1106, and 1110. The first entry of column 1102 identifies the maximum expected frequency for camera module 1 corresponding to depth D1 and is identified in the table as "$MF_{D1CM1}$" (e.g., Maximum Frequency corresponding to Depth D1 and Camera Module CM1). The first entry of column 1104 identifies the maximum expected frequency for camera module 2 corresponding to depth D1 and is identified in the table as "$MF_{D1CM2}$" (e.g., Maximum Frequency corresponding to Depth D1 and Camera Module CM2). Similarly the first entries in each of the column 1106, 1110 indicate the respective maximum expected frequencies "$MF_{D1CM3}$" and "$MF_{D1CMX}$" for camera module 3 and camera module X corresponding to depth D1 respectively.

Consider now the second row 1122 corresponding to depth D2 and the corresponding second entry in each of the columns 1102, 1104, 1106, and 1110. The second entry of column 1102 identifies the maximum expected frequency "$MF_{D2CM1}$" for camera module 1 corresponding to depth D2, the second entry of column 1104 identifies the maximum expected frequency "$MF_{D2CM2}$" for camera module 2 corresponding to depth D2. Similarly the second entries in each of the column 1106, 1110 indicate the respective maximum expected frequencies "$MF_{D2CM3}$" and "$MF_{D2CMX}$" for camera module 3 and camera module X corresponding to depth D2.

Now consider that last row 1130 corresponding to depth DN and the corresponding fields in each of the columns 1102, 1104, 1106, and 1110. The last entry in column 1102 corresponding to row 1130 identifies the maximum expected frequency "$MF_{DNCM1}$" for camera module 1 corresponding to depth DN, the last entry of column 1104 identifies the maximum expected frequency "$MF_{DNCM2}$" for camera module 2 corresponding to depth D2, and the last entries in each of the column 1106, 1110 indicate the respective maximum expected frequencies "$MF_{DNCM3}$" and "$MF_{DNCMX}$" for camera module 3 and camera module X corresponding to depth DN. The entire table 1100 can thus be read in a similar manner as discussed above.

Figure 12:
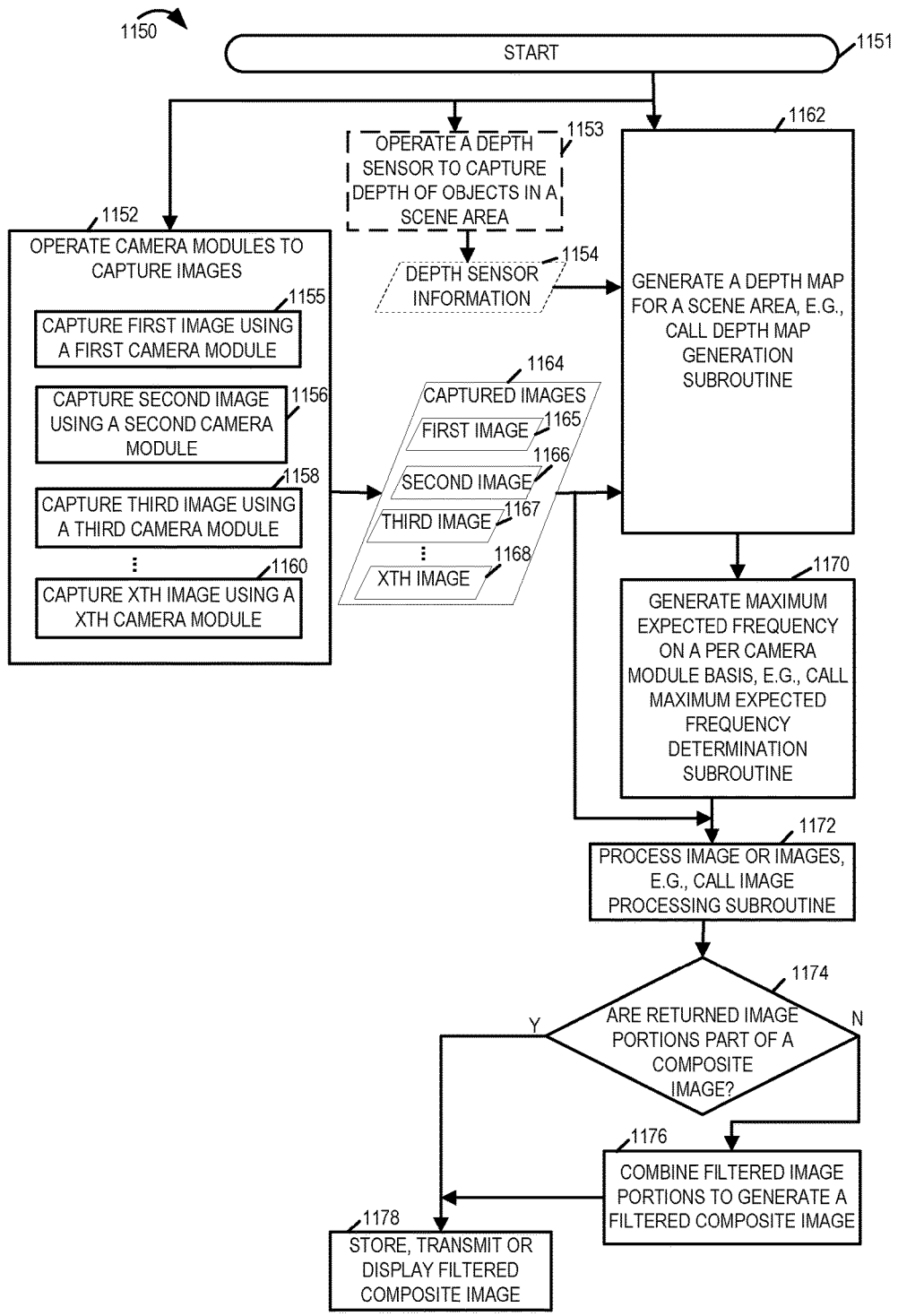
FIG. 12 illustrates the steps of an exemplary method of operating a device to generate an image, in accordance with an exemplary embodiment of the invention.

FIG. 12 is a flowchart 1150 illustrating the steps of an exemplary method of operating a device, e.g., such as that shown in FIG. 6, to generate an image, in accordance with one embodiment of the invention. The method of flowchart 1150 can and sometimes is implemented by a camera device including the same or similar elements as the camera device 100 of FIG. 1 and device 200 of FIG. 4A. While the exemplary method can be implemented by a camera device, at least some steps of the method may also be implemented by a processing device such as a computer which may be provided with captured images and depth information to perform de-noising and/or filtering in accordance with the invention.

The exemplary method starts in step 1151, e.g., when a user of a camera device, e.g., camera 100, presses a button or takes another action to trigger the capture of an image of a scene area of interest. For the purposes of discussion consider that the camera device includes a plurality of optical chains, e.g., camera modules, such as the ones shown in FIGS. 7A and 7B, which can be operated and controlled independently and/or in a coordinated manner.

Operation proceeds from start step 1151 to step 1152. The operation also proceeds to steps 1153 and 1162. Processing along the different paths may occur in an asynchronous manner. Step 1153 corresponds to depth capture operation which can be performed by depth sensing device in some embodiments. Step 1162 corresponds to a depth map generation subroutine illustrated in FIG. 13 discussed later.

Returning to step 1152. In step 1152 one or a plurality of camera modules are operated to capture images corresponding to a scene area of interest, e.g., scene 802. In some embodiments step 1152 includes one or more of steps 1155, 1156, 1158 and 1160. In step 1155 a first image is captured using a first camera module. In step 1156 a second image is captured using a second camera module. In step 1158 a third image is captured using a third camera module. In step 1160 an Xth image is captured using an Xth camera module. Consider for discussion purposes that the first camera module is e.g., camera module 1228 with the small focal length (f1) and the first image corresponds to the scene area 802 of FIG. 9, the second camera module is e.g., camera module 1204 with the larger focal length (f2) and the second image corresponds to scene area 902, the third camera module is e.g., camera module 1208 with focal length (f2) and the third image corresponds to scene area 904 which is a portion of the scene area 802, the Xth camera module is e.g., camera module 1214 with focal length (f2) and the Xth image corresponds to scene area 908. As discussed earlier, each of the captured scene area 902, 904, 906 are portions of the scene area 802. In some embodiments the camera modules capture the first, second, third, . . . , Xth images in parallel.

Captured image output 1164 represents the output of step 1152 with the captured image output 1164 including the first image 1165, the second image 1166, the third image 1167, ..., the Xth image 1168. The captured images 1164 serve as an input to step 1162 and to step 1172 as will be discussed.

Referring to step 1153 which is optional and maybe performed in parallel or asynchronously with respect to step 1152. In step 1153 a depth sensing equipment is operated to capture depth of objects in the scene area of interest 802. The depth sensing equipment captures depth information corresponding to the scene of interest and produces the depth sensor information 1154 as an output which serve as an input to step 1162. Depth information corresponding to a scene or a portion of scene may be generated in a variety of ways and accordingly step 1153 is optional. For example in some embodiments the depth information is generated by the camera device capturing the images and/or a processing device using the captured images.

Figure 13:
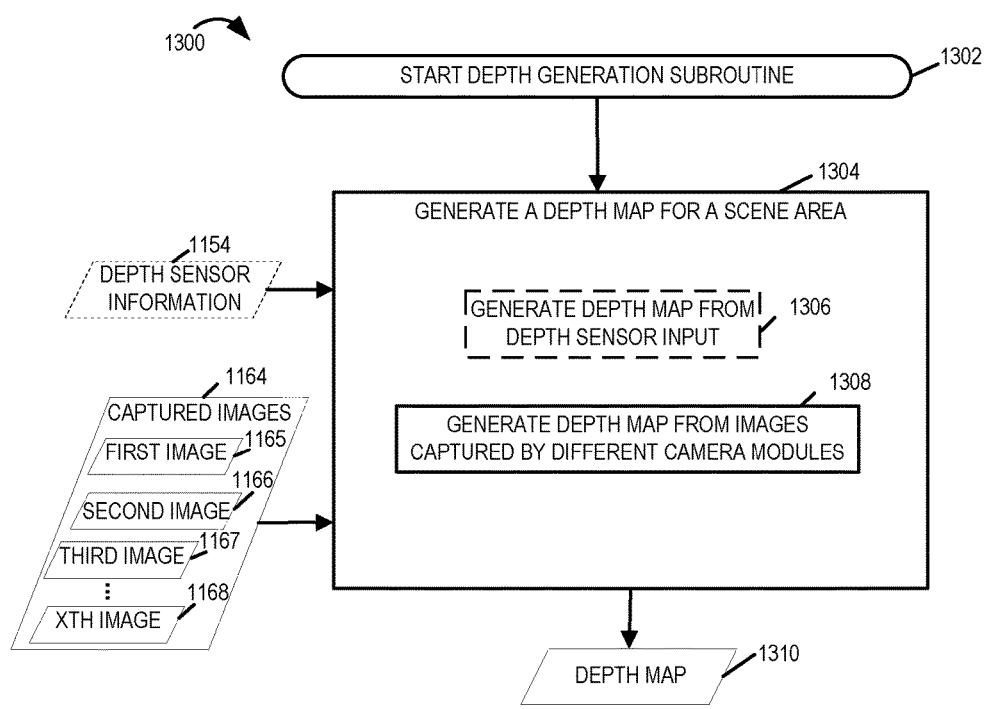
FIG. 13 is a flowchart illustrating the steps of a depth map generation subroutine implemented in accordance with an exemplary embodiment.

Referring now to step 1162. In step 1162 depth map for a scene area, e.g., scene area 802, is generated. In some embodiments step 1162 includes receiving, as input, portions of the first image captured by the first camera module, portions of the first image captured by the second camera module, portions of the third image captured by the third camera module, ..., and receiving portions of the Xth image captured by the Xth camera module, for processing. In various embodiments the step 1162 of generating a depth map invokes or initiates a call to a depth map generation subroutine which is illustrated in FIG. 13. Referring now to FIG. 13 which illustrates the steps of the depth map generation subroutine 1300. The depth map generation subroutine 1300 execution starts in step 1302 and proceeds to step 1304 with the input to step 1304 being the depth sensor information 1154 and the captures images 1164. In step 1302 depth map for the scene area of interest is generated using the input 1154 and/or 1164. In some embodiments only one of the inputs 1154 or 1164 is used for generating the depth map for the scene. In some embodiments step 1302 is implemented by performing one of the steps 1306 or 1308. In some embodiments when step 1306 is performed, the depth map for the scene area is generated from the depth sensor input, i.e., depth sensor information 1154 produced by a depth sensing device. In some other embodiments where step 1308 is performed, the depth map for the scene area is generated from images captured by the camera modules, e.g., using captured images 1164 as input to generate the depth map. Regardless of which method is used to generate the depth map, step 1304 produces a depth map 1310 for the scene area of interest, e.g., scene area 802. The generated depth map 1310 includes depth information corresponding to various objects in the scene area which are at different depths with respect to the camera modules. For discussion purposes, with reference to the example of FIGS. 8 and 9, consider that there are five different depths (e.g., D1, D2, D3, D4, D5) in the scene area of interest 802 corresponding to the objects in the scene. In some embodiments the scene area 802 can be divided, for processing purposes, based on the different depths in the generated depth map for the scene area 802. The generated depth map 1310 is returned as the output of the subroutine 1300 at the completion of the execution of subroutine 1300.

Returning to step 1162 of FIG. 12. The depth map generation step 1162 produces the depth map 1310 as discussed above. In some embodiments the step 1162 of generating the depth map includes determining the depths to which portions of the first image correspond based on the generated depth map. Operation proceeds from step 1162 to step 1170. In step 1170 maximum expected frequency is generated in accordance with the invention on a per camera module basis. In various embodiments step 1170 of generating maximum expected frequency invokes or initiates a call to a maximum expected frequency determination subroutine which is illustrated in FIG. 14.

Figure 14:
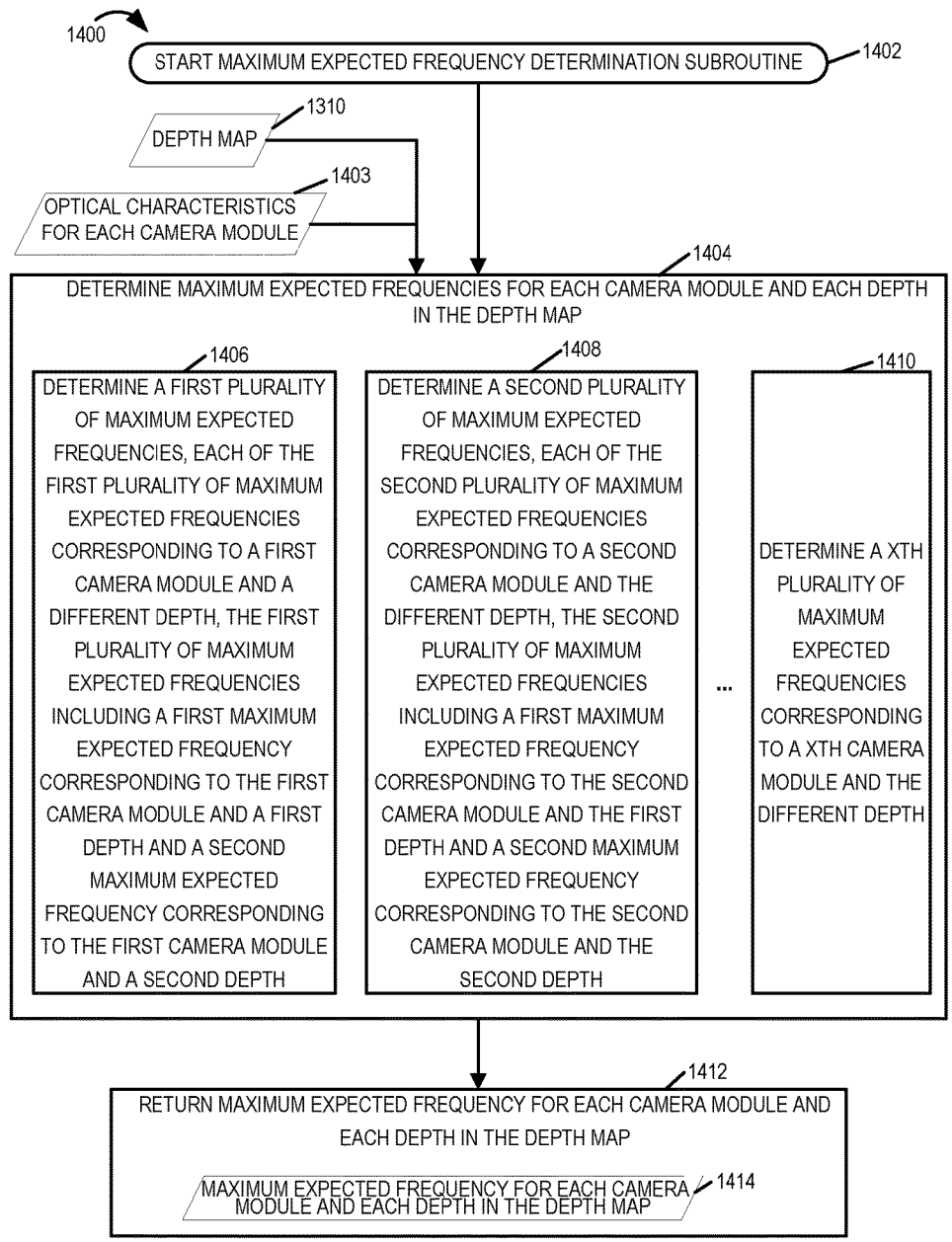
FIG. 14 illustrates the steps of a maximum expected frequency determination subroutine implemented in accordance with some exemplary embodiments.

Referring now to FIG. 14 which illustrates the steps of the maximum expected frequency determination subroutine 1400. The maximum expected frequency determination subroutine 1400 execution starts in step 1402 when the call to the subroutine 1400 is made in step 1170 and proceeds to step 1404. The input to step 1404 are the depth map 1310 and optical characteristics of various camera modules used to capture images. The optical characteristic of different camera modules may be different and in some embodiments include, e.g., focal length, object distance lens setting, aperture setting, pixel size of sensor etc. The depth map 1310 provides information on depth of scene elements. In step 1404, maximum expected frequencies for each camera module and each depth in the depth map. In accordance with one aspect, given the depth information for a scene area (depths of scene elements) and the optical characteristics of a camera module used to capture the scene area or portion of the scene area, a maximum expected frequency for each depth can be determined. Thus in step 1404 a plurality of maximum expected frequencies corresponding to various camera modules and various depths is generated. In various embodiments step 1404 includes performing one or more of the steps 1406 through 1410 depending on the number of camera modules used to capture image and/or image portions of the scene area 802.

In step 1406 a first plurality of maximum expected frequencies is determined, each of the first plurality of maximum expected frequencies corresponding to the first camera module, e.g., camera module 1228, and a different depth, the first plurality of maximum expected frequencies including a first maximum expected frequency corresponding to the first camera module and a first depth (e.g., D1) and a second maximum expected frequency corresponding to the first camera module and a second depth (e.g., D2). Continuing with the example above where we considered five depths indicated in the depth map for the scene area 802, the first plurality of maximum expected frequencies may include five maximum expected frequencies. In step 1408 a second plurality of maximum expected frequencies is determined, each of the second plurality of maximum expected frequencies corresponding to the second camera module, e.g., camera module 1204, and the different depth, the second plurality of maximum expected frequencies including a first maximum expected frequency corresponding to the second camera module and the first depth (e.g., D1) and a second maximum expected frequency corresponding to the second camera module and the second depth (e.g., D2). Similarly maximum expected frequencies are determined for other camera modules and different depth in a similar manner with step 1410 being performed to determine an Xth plurality of maximum expected frequencies corresponding to the Xth camera module, e.g., camera module 1214, and the different depths, the Xth plurality of maximum expected frequencies including a first maximum expected frequency corresponding to the Xth camera module and the first depth and a second maximum expected frequency corresponding to the Xth camera module and the second depth. In some embodiments a maximum expected frequency corresponding to a given depth indicates the maximum amount of high frequency components present in the neighborhood of a pixel or group of pixels to which the depth corresponds.

Having generated the plurality of maximum expected frequencies, the operation proceeds from step 1404 to step 1412. In step 1412 the set of maximum expected frequencies for each camera module and depth in the depth map 1310 is returned as the output 1414 of subroutine 1400. The output 1414 includes the determined maximum expected frequencies for each camera module and depth in the depth map. The determined maximum expected frequencies for each camera module and depth in the depth map depth map 1414 is returned to the main processing path of FIG. 12.

Returning to step 1170 of FIG. 12. Having determined the maximum expected frequencies for each camera module and depth in the depth map depth map the operation proceeds from step 1170 to step 1172 with the output 1414 of subroutine 1400 and captured images 1164 serving as inputs to step 1172. In step 1172 received input image or images are processed in accordance with the features of invention. In various embodiments step 1172 of processing input image(s) includes a call to image processing subroutine 1500 which is illustrated in FIG. 15.

Figure 15:
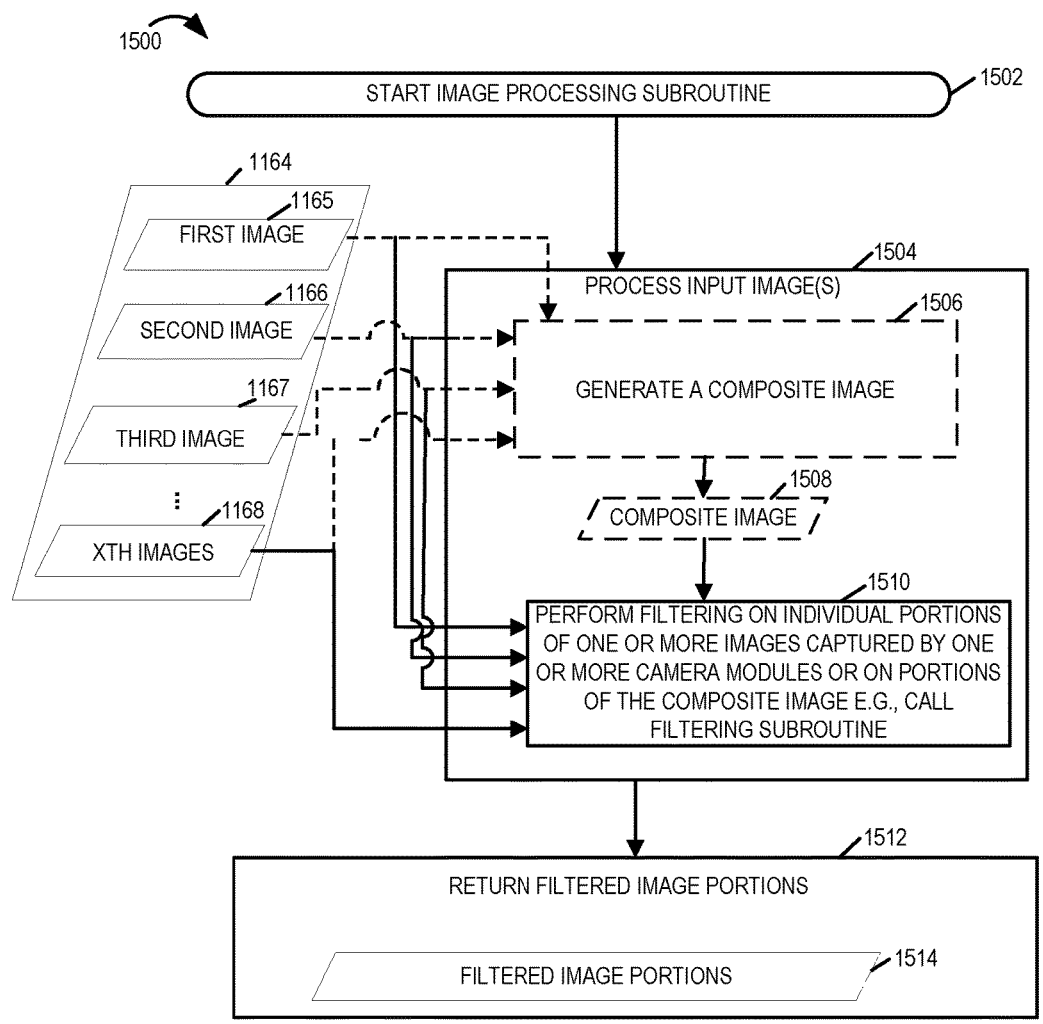
FIG. 15 illustrates the steps of an image processing subroutine implemented in accordance with some exemplary embodiments.

Referring now to FIG. 15 which illustrates the steps of the image processing subroutine 1500. The image processing subroutine 1500 execution starts in step 1502 when the call to the subroutine 1500 is made in step 1172 and proceeds to step 1504. The input to step 1504 are the captured image(s) 1164 and the determined maximum expected frequencies for each camera module and depth 1414 from the previous step. In step 1504 the input image(s) are processed. In some embodiments this includes optionally generating a composite image as shown in optional step 1506. The composite image may be generated using two or more images captured by different camera modules, e.g., two or more of the first image 1165, second image 1166, third image 1167, . . . , X th images 1168. The output of step 1506 is the generated composite image 1508 which serves as an input to image filtering step 1510 which is performed as part of the image processing step 1504 in some embodiments. The captured image(s) 1164 including the first image 1165 through Xth image 1168 also serve as inputs to the filtering step 1510. Depending on a mode of operation and/or camera user's desire or setting the filtering operation can be performed on either individual image portions of the input captured image(s) 1164 or the portions of the composite image 1508. In some embodiments step 1510 includes receiving portions of the first image captured by the first camera module, portions of the first image captured by the second camera module, portions of the third image captured by the third camera module, . . . , and receiving portions of the Xth image captured by the Xth camera module, for processing. Step 1510 includes a call to the filtering subroutine 1600 illustrated in FIG. 16.

Figure 16:
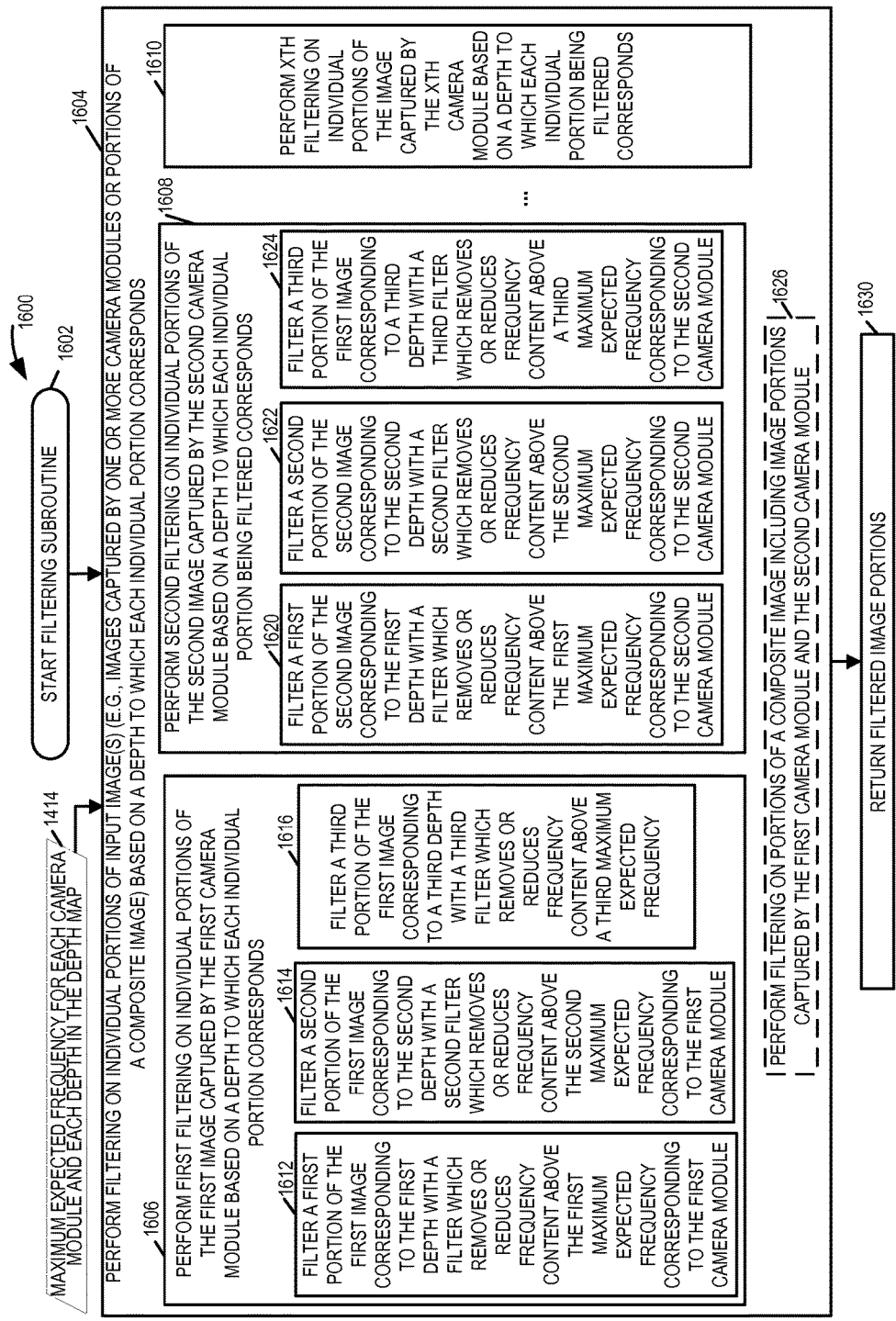
FIG. 16 is a flowchart showing the steps of a filtering subroutine implemented in accordance with some embodiments.

Referring now to FIG. 16 showing the steps of the filtering subroutine 1600 implemented in accordance with some embodiments. The filtering subroutine 1600 execution starts in step 1602 and proceeds to step 1604. The inputs to step 1604 are the captured image(s) 1164 and/or the composite image 1508 (if filtering is to be performed on the composite image) and the determined maximum expected frequencies for each camera module and depth 1414. In step 1604 filtering is performed on individual portions of the input image(s), e.g., portions of images 1164 captured by the camera modules or portions of the composite image 1508, based on the depth to which each individual portion corresponds. Thus each portion, e.g., including one or a group of pixels, of an image being filter is mapped to a corresponding depth since different portions of the image may correspond to different depths. Recall that for each camera module and each depth in the generated depth map there is a determined maximum expected frequency which serves as an input to the filtering step 1604 and in various embodiments filtering is performed using the determined maximum expected frequency values. Based on the image portions being filtered, e.g., portions of the first, second, . . . , Xth images, or portions of the composite image the step of filtering operation is implemented by performing either one or more of the steps 1606, 1608, . . . , 1610 or by performing step 1626 if the filtering is being performed on the portions of the composite image.

First considering the case where input images to be filtering include one or more of the first, second, . . . , Xth images. In step 1606 a first filtering operation is performed on individual portions of the first image 1165 captured by the first camera module based on a depth to which each individual portion of the first image corresponds. In various embodiments step 1606 includes one or more of the steps 1612, 1614 and 1616 depending on the number of portions of the first image corresponding to different depths. In step 1612 a first portion of the first image corresponding to a first depth is filtered with a first filter which removes or reduces frequency content above the first maximum frequency corresponding to the first camera module and the first depth. In step 1614 a second portion of the first image corresponding to a second depth is filtered with a second filter which removes or reduces frequency content above the second maximum frequency corresponding to the first camera module and the second depth. In step 1616 a third portion of the first image corresponding to a third depth is filtered with a third filter which removes or reduces frequency content above the third maximum frequency corresponding to the first camera module and the third depth.

In step 1608 a second filtering operation is performed on individual portions of the second image 1166 captured by the second camera module based on a depth to which each individual portion of the second image being filtered corresponds. In various embodiments step 1608 includes one or more of the steps 1620, 1622 and 1624 depending on the number of portions of the second image corresponding to different depths. In step 1620 a first portion of the second image corresponding to the first depth is filtered with a first filter which removes or reduces frequency content above the first maximum frequency corresponding to the second camera module and the first depth. In step 1622 a second portion of the second image corresponding to the second depth is filtered with a second filter which removes or reduces frequency content above the second maximum frequency corresponding to the second camera module. In step 1624 a third portion of the second image corresponding to the third depth is filtered with a third filter which removes or reduces frequency content above the third maximum frequency corresponding to the second camera module. While only three filtering steps for filtering three portions of the image corresponding to three depths are shown in the figure for simplification, it should be appreciated that the number of image portions maybe much greater, e.g., N filtering operations on N image portions, depending on how the image is partitioned based on the number of different depths in the depth map. Each of the filtering operations for filtering image portions remove or reduces high frequency component in the given portion of the image which are above the maximum expected frequency (e.g., maximum amount of high frequency components present in the neighborhood) for that portion.

Step 1610 includes filtering performed on portions of an image captured by the Xth camera module performed in a manner similar to what is discussed with regard to steps 1606 and 1608, with the filtering operation being performed on individual portions of the image captured by the Xth camera module based on a depth to which each individual portion of the image corresponds. Step 1610 may include one or more steps similar to substeps 1612, 1614, 1616 depending on the number of portions of the image captured by the Xth camera module corresponding to different depths.

Now consider step 1626 which shows the case where filtering is performed on portions of the composite image, e.g., when the input image to be filtered is the composite image 1508 including image portions captured by the first camera module and the second camera module. In step 1626 filtering operation is performed on portions of the composite image 1508 based on a depth to which each individual portion of the composite image corresponds. Operation proceeds from step 1604 of performing filtering operations to step 1630. In step 1630 the filtered image portions are returned to the main processing path of FIG. 12.

Returning now to step 1172 of FIG. 12. Having processed, e.g., filtered, images in accordance with the invention, the operation proceeds from step 1172 to step 1174 with the output of subroutine 1600, i.e., filtered image portions, being available for further processing and/or next operation. In step 1174 it is determined if the returned filtered image portions part of a composite image, e.g., composite image 1508. In some embodiments upon determining that the returned filtered image portions are part of the composite image the operation proceeds to step 1176 otherwise the operation proceeds to step 1178. In step 1176 the returned filtered image portions are combined to generate a filtered composite image. Operation proceeds from step 1176 to step 1178. In step 1178 the filtered composite image (including filtered image portions) are stored, transmitted to another device or displayed, e.g., on a display device.

Figure 17:
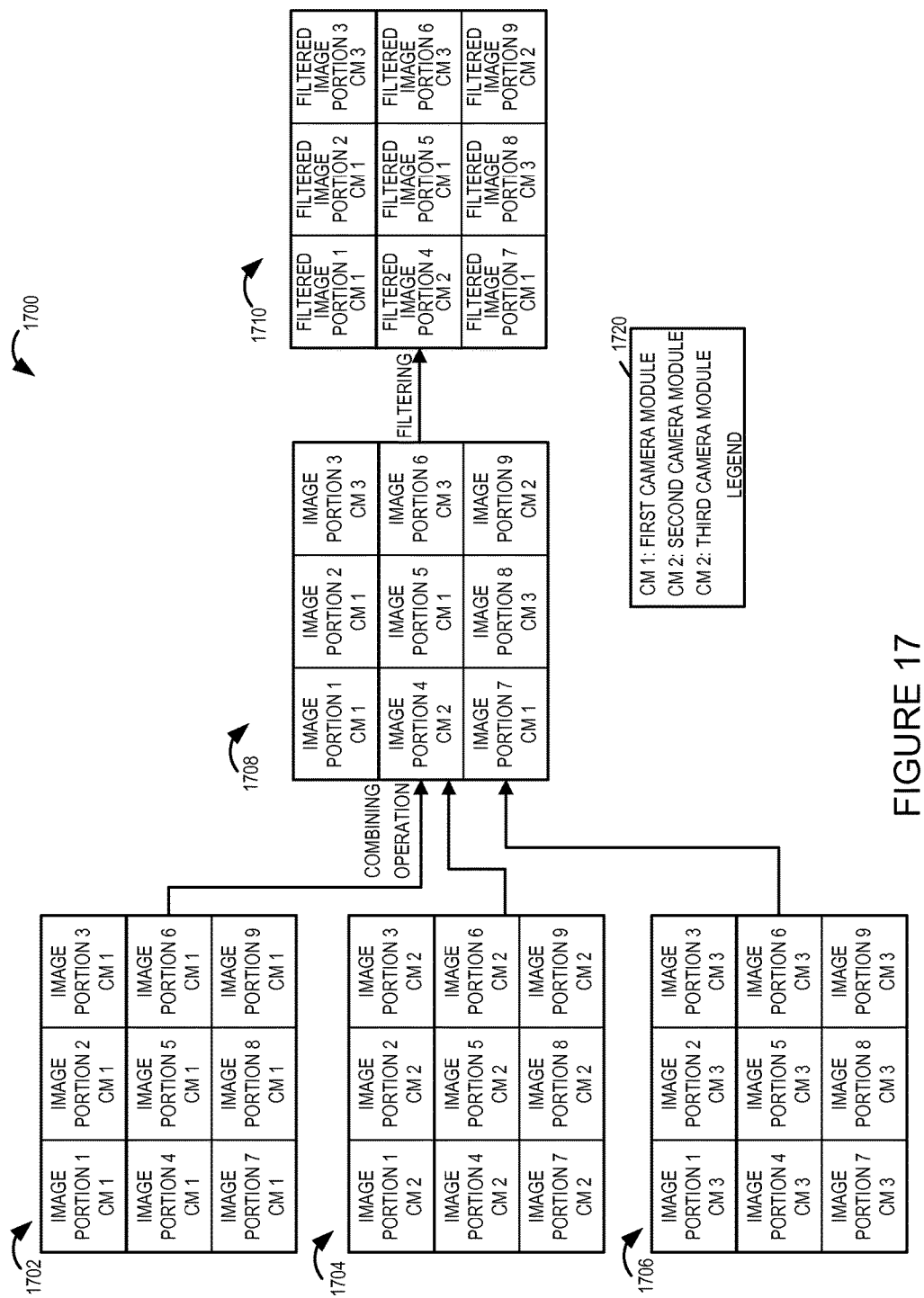
FIG. 17 is a drawing illustrating an example where filtering operation is performed on portions of an exemplary composite image generated prior to the filtering operation by combining images captured by various camera modules, in accordance with one embodiment of the invention.

FIG. 17 is a drawing 1700 illustrating an example where filtering operation is performed on the portions of a composite image 1708 which is generated prior to the filtering operation by combining images captured by various camera modules, in accordance with one embodiment of the invention. Drawing 1700 shows three exemplary images 1702, 1704 and 1706, which are captured by three different camera modules, are first subject to combining operation to generate an exemplary composite image 1708 which is then subjected to a filtering operation in accordance with the features of the present invention to generate an exemplary filtered composite image 1710. The legend 1720 shows what each of the abbreviated letters indicate in the drawing 1700.

While each of the first, second and third images may include N portions, in the illustrated example the first, second and third images 1702, 1704 and 1706 each include nine portions. The first image 1702 captured by a first camera module (CM 1) includes image portion 1 CM 1 to image portion 9 CM 1, the second image 1704 captured by a second camera module (CM 2) includes image portion 1 CM 2 to image portion 9 CM 2 and the third image 1706 captured by a third camera module (CM 3) includes image portion 1 CM 3 to image portion 9 CM 3. As discussed above, each of the image portions corresponds to and/or mapped to a corresponding depth in the depth map for the scene area to which the images 1702, 1704 and 1706 correspond.

The first, second and third images 1702, 1704 and 1706 are combined to generate a composite image 1708 including portions of images captured by the first, second and third camera modules. In the example composite image 1708 includes nine portions. As can be appreciated from the drawing the exemplary composite image 1708 includes image portions from different ones of the first, second and third images. As can be seen the exemplary composite image 1708 includes image portion 1 CM 1 (portion from first image 1702), image portion 2 CM 1 (portion from first image 1702), image portion 3 CM 3 (portion from third image 1706), image portion 4 CM 2 (portion from second image 1704), image portion 5 CM 1 (portion from first image 1702), image portion 6 CM 3 (portion from third image 1706), image portion 7 CM 1 (portion from first image 1702), image portion 8 CM 3 (portion from third image 1706) and image portion 9 CM 2 (portion from second image 1704).

Next the exemplary composite image 1708 is filtered in accordance with the invention as discussed above to produce the exemplary filtered composite image 1710. The exemplary filtered composite image 1710 includes corresponding filtered portions, each of which is filtered in a similar manner as discussed in step 1604 of FIG. 16, e.g., with each portion being filtered based on a depth to which the image portion corresponds. The filtered composite image 1710 may be stored, transmitted and/or displayed in some embodiments.

Figure 18:
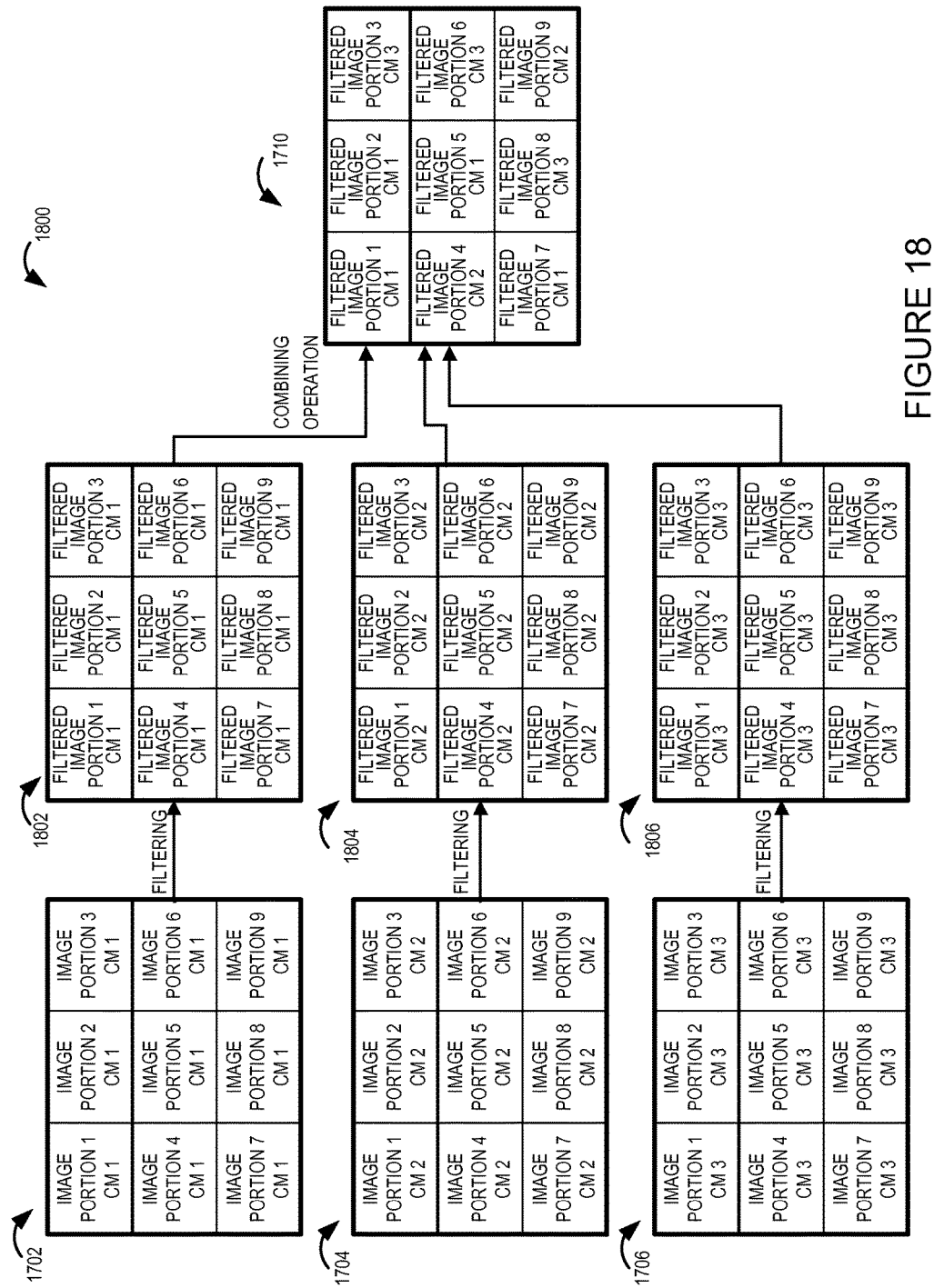
FIG. 18 illustrates another example of filtering and image generation where filtering performed on individual portions of a plurality of input images to generate filtered images including filtered image portions and a filtered composite image is generated by combining filtered portions of the input images, in accordance with one embodiment of the invention.

FIG. 18 is a drawing 1800 illustrating another example of performing filter in accordance with some embodiments where filtering operation in accordance with the invention is performed on the portions of a plurality of input images 1702, 1704 and 1706 prior to the filtered composite image 1710 being generated by combining filtered portions of the input images, in accordance with one embodiment of the invention.

In the drawing 1800 example the first, second and third images 1702, 1704 and 1706 are each subjected to a filtering operation in accordance with the features of the invention. Accordingly each portion of the first image 1702, second image 1704 and the third image 1706 is filtered in the manner as discussed with regard to step 1604 of FIG. 16. Thus each portion of the first image 1702 captured by the first camera module is filtered based on the depth to which each individual portion corresponds with the filtering reducing or removing the high frequency components from the individual image portions which are above the maximum expected frequency corresponding to the first camera module and corresponding depth. The filtering operation on the first image 1702 produces an exemplary filtered first image 1802 including nine filtered image portions as shown in drawing 1800. Each portion of the second image 1704 captured by the second camera module is filtered based on the depth to which each individual portion corresponds with the filtering reducing or removing the high frequency components from the individual image portions which are above the maximum expected frequency corresponding to the second camera module and corresponding depth. The filtering operation on the second image 1704 produces an exemplary filtered second image 1804 including nine filtered image portions. Similarly each portion of the third image 1706 captured by the third camera module is filtered based on the depth to which each individual portion corresponds. The filtering operation on the third image 1706 produces an exemplary filtered third image 1806 including nine filtered image portions of the third image.

The first, second and third filtered images 1802, 1804 and 1806 are then subject to a combining operation to generate the filtered composite image 1710 including filtered image portions from different ones of the first second and third filtered images 1802, 1804 and 1806. As should be appreciated from FIGS. 17-18, regardless of whether the filtering is performed on the portions of a composite image or on individual portions of the first, second and third images prior to combining to generate the composite, the resulting filtered composite image 1710 remains the same in both cases as can be seen from FIGS. 17-18.

Figure 19:
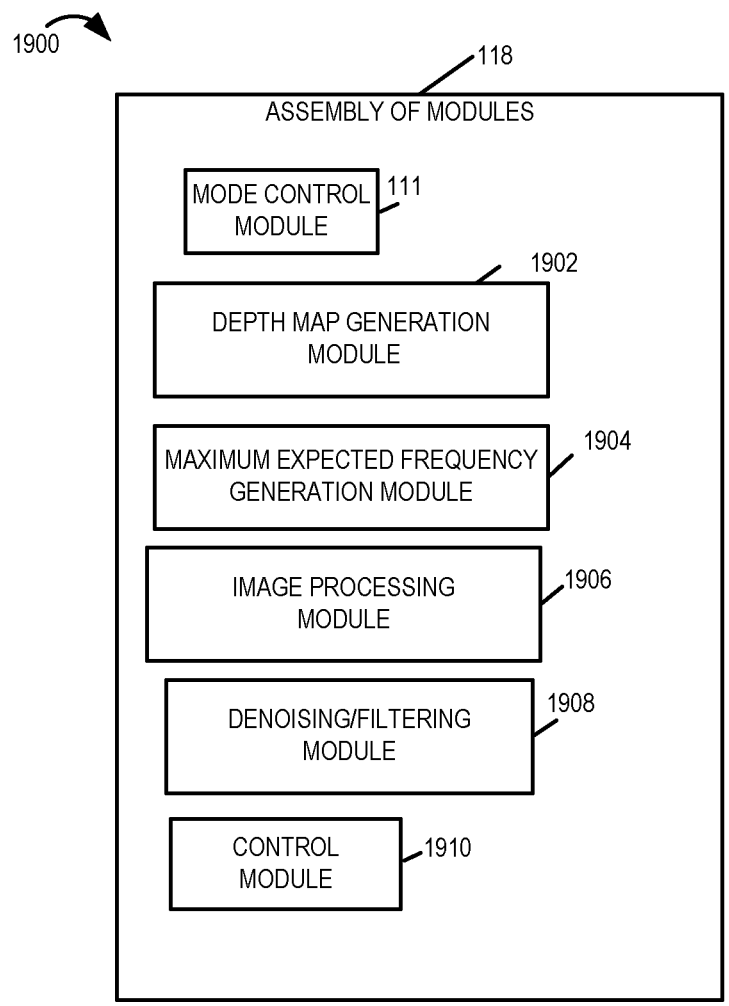
FIG. 19 illustrates an assembly of modules which can be used in an apparatus, e.g., such as the camera device, implemented in accordance with the features of the invention.

FIG. 19 is a drawing 1900 illustrating the assembly of modules 118 which is used in the camera device 100 in some embodiments. The assembly of modules 118 includes modules including one or more software routines, e.g., machine executable instructions, for implementing the methods of the present invention including image capture, image generation, filtering and/or image data processing methods of the present invention. Individual steps and/or lines of code in the modules of assembly 118 when executed by the processor 110 control the processor 110 to perform steps of the method of the invention, e.g., generating depth map, determining maximum expected frequencies and/or filtering image portions, in accordance with the invention. When executed by processor 110, the assembly of modules 118 cause at least some data to be processed by the processor 110 in accordance with the method of the present invention, e.g., filtering image portions in accordance with the invention. While the assembly of modules 118 illustrated in FIG. 19 is used in the camera device 100 in some embodiments, the assembly of modules 118 can be used in another processing device that includes a memory and processor, e.g., a computer, laptop, Smartphone, tablet device etc., to perform the functions corresponding to the steps of the methods of the invention.

In addition to the mode control module 111 already discussed above the assembly of modules 118 further includes a depth map generation module 1902, a maximum expected frequency generation module 1904, an image processing module 1906, a denoising/filtering module 1908 and a control module 1910.

The depth map generation module 1902 is configured to generate a depth map for a scene area of interest. The depth map generation module 1902 may generate the depth map based on input provided by a depth sensor device and/or using images captured by the camera modules in the assembly of camera modules as discussed in detail earlier, e.g., with regard to FIGS. 12 and 13. In some embodiments the depth map generation module 1902 is configured to generate a depth map for a scene area corresponding to a first image captured by a first camera module and determine the depths to which portions of the first image correspond based on the generated depth map. In some embodiments the depth map generation module 1902 generates the depth map from multiple images of said scene area captured by different camera modules.

The maximum expected frequency generation module 1904 is configured to determine and generate, on a per camera module basis, maximum expected frequencies based on the depth information in a generated depth and optical characteristics of the camera modules. In some embodiments the maximum expected frequency generation module 1904 generates maximum expected frequencies for each camera module used to capture an image portion and each depth in the depth map. Thus the maximum expected frequency generation module 1904 is configured to determine the plurality of maximum expected frequencies, e.g., first plurality, second plurality, . . . , Xth plurality of maximum expected frequencies, corresponding to the different camera modules as discussed in FIG. 14 in detail. Thus in some embodiments the maximum expected frequency generation module 1904 is configured to perform the functions corresponding to the maximum expected frequency generation steps discussed in FIG. 14. In some embodiments each of the plurality of generated maximum expected frequencies corresponds to a camera module and a depth.

The image processing module 1906 is configured to process the images in accordance with various features of the invention. In some embodiments the image processing module 1906 receives images and/or image portions captured by one or more camera modules for processing in accordance with the invention and/or receive filtered portions of images to process, e.g., combine, to generate a filtered composite image. In some embodiments the image processing module 1906 is configured to generate a composite image, e.g., composite image 1508/1708 from two or more image portions corresponding to images captured by the camera modules. In some embodiments the image processing module 1906 is configured to generate a filtered composite image using filtered image portions which have been filtered by the filtering module 1908 in accordance with the features of the invention.

The denoising/filtering module 1908 is configured to perform filtering operations on image portions of input image(s) in accordance with the invention as discussed in detail with regard to FIG. 16. The denoising/filtering module 1908 in some embodiments is configured to perform filtering on individual portions of input image(s), e.g., images captured by one or more camera modules or portions of a composite image, based on a depth to which each individual portion corresponds. In various embodiments in performing the filtering operation the filtering module 1908 uses the determined maximum expected frequency information to reduce and/or eliminate the noise content from input images. In various embodiments the filtering module 1908 is configured to perform a first filtering on individual portions of a first image captured by a first camera module based on a depth to which each individual portion corresponds. In some embodiments the filtering module 1908 applies first filtering to portions of the first image based on the determined depth of the individual image portions. In some embodiments the first filtering includes: filtering a first portion of the first image corresponding to a first depth with a filter which removes or reduces frequency content above a first maximum expected frequency corresponding to the first camera module, filtering a second portion of said first image corresponding to the second depth with a second filter which removes or reduces frequency content above said second maximum expected frequency corresponding to the first camera module and filtering a third portion of said first image corresponding to a third depth with a third filter which removes or reduces frequency content above a third maximum expected frequency. In some embodiments the filtering module 1908 is further configured to perform a second filtering on individual portions of the second image captured by a second camera module based on a depth to which each individual portion being filtered corresponds. The filtering module 1908 performs filtering on image portions of images captured by other camera modules in a similar manner. Thus in some embodiments the denoising/filtering module 1908 is configured to perform the filtering operations discussed with regard to the steps shown in FIG. 16. The output of the filtering module 1908 include filtered image portions, e.g., such as the filtered image portions of image 1710 or 1802, 1804, 1806.

The control module 1910 controls various modules of the assembly to perform their respective functions in accordance with the features of the present invention and manages input and output of the modules, e.g., supplying input to a module in the assembly 118 from another module or element of the device 100 and/or providing the generated output from any of the modules in the assembly 118 to another module or element, e.g., for further processing, storage, display or transmission.

While FIG. 19 shows the assembly of modules 118 where at least some of the modules are implemented in software, e.g., machine executable instructions, it should be appreciated that such modules can, and in some embodiments are, implemented in hardware, e.g., as an ASIC, or a field-programmable gate array (FPGA) or other circuit, in the assembly of hardware modules 180. Thus the assembly of hardware modules 180 includes hardware modules, e.g., circuits, corresponding to each of the modules discussed above with regard to FIG. 19 including the mode control module 111, depth map generation module 1902, maximum expected frequency generation module 1904, image processing module 1906, denoising/filtering module 1908 and the control module 1910. In still some embodiments the modules are implemented as a combination of software and hardware.

Figure 20:
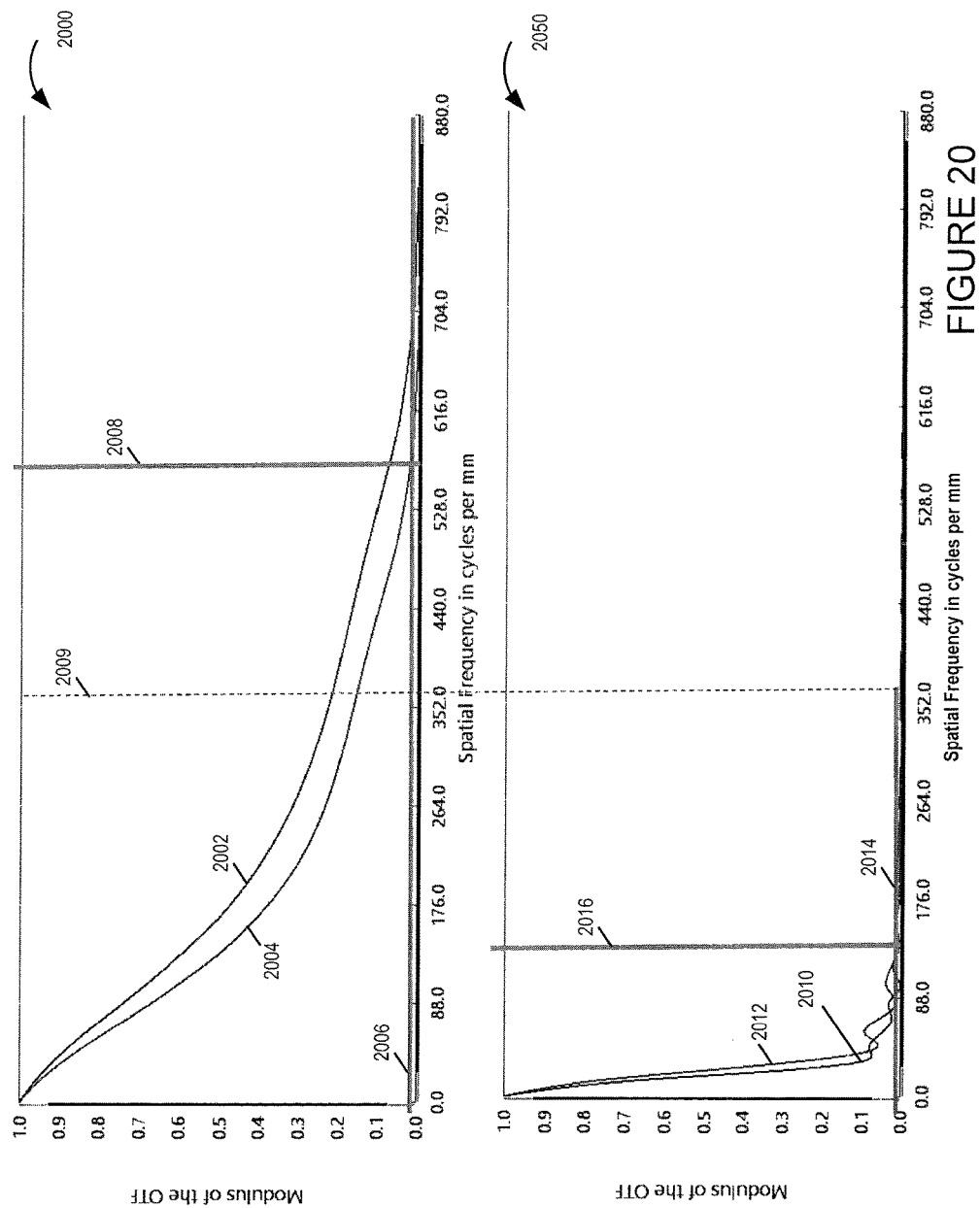
FIG. 20 includes two exemplary plots showing the variation of modulus of optical transfer function (MOTF) with respect to spatial frequency in two different respective scenarios with different lens focus settings.

FIG. 20 includes two exemplary plots 2000 and 2050 showing the variation of the modulus of optical transfer function (MOTF) with respect to spatial frequency in two different respective scenarios with different lens focus settings. In each of the exemplary plots the modulus of optical transfer function is shown on the Y-axis while the spatial frequency is shown on the X-axis. Furthermore for each plot, the image sensor size (1.4 micron pixels) and sensor Nyquist sampling rate remains the same. The sensor Nyquist sampling rate is calculated as 1 mm/2×1.4 micron=357 cycles/mm and is represented in the figure by dashed line 2009. Anything above the sensor Nyquist frequency (357 cycles/mm) can not be sampled by the sensor without aliasing.

The first exemplary plot 2000 corresponds to a camera focus setting where the camera lens is accurately, e.g., perfectly, focused at an object at a given distance, e.g., 54 meters in this example. The upper curve 2002 in plot 2000 is for an object at the given distance from the camera, which is perfectly on axis while the other, lower curve 2004, corresponds to an off-axis object at the same distance. For both curves 2002 and 2004 the object is placed at the same distance, e.g., 54 meters, from the camera. The flat curve 2006 represents the noise threshold. In accordance with an aspect of various embodiments, the spatial frequencies below the noise threshold can be considered as noise. As can be seen in the first plot 2000, for an accurately focused lens, the noise threshold can be reached at a spatial frequency of about 550 cycles/mm for the off axis object as indicated by line 2008.

The second exemplary plot 2050 corresponds to a camera focus setting where the camera lens is defocused, e.g., out of focus, by 100 microns, on an object at a given distance. The upper curve 2010 in plot 2050 is for an object which is perfectly on axis while the other lower curve 2012 corresponds to an off-axis object at the same distance. For both curves 2010 and 2012 the object is placed at the same distance, e.g., 54 meters, from the camera. The flat line/curve 2014 represents the noise threshold. As can be seen in the second plot 2050 the noise threshold can be reached at a spatial frequency of about 110 cycles/mm for a defocused off axis object as indicated by line 2016. Thus for a defocused object, like the lower MOTF, the noise threshold is reached at a much lower spatial frequency than for the focused object.

From FIG. 20 it should be appreciated that for an object at a distance from a camera which is different from the distance at which the camera lens is focused, the noise threshold will be reached at a much lower frequency than for an object which in focus as can be appreciated by the difference in positions of lines 2008 and 2016 in FIG. 20. In various embodiments, depth information is used in combination with information about the camera optics, e.g., MOTF information, to determine whether a portion of an image corresponds to a depth which is in or out of focus and what the noise threshold is for the depth to which an image portion corresponds. In some embodiments, image portions are filtered to remove or smooth frequencies above the noise threshold determined based on depth information with different portions of an image being filtered using different filters. In some embodiments the filter applied to a particular image portion treats frequencies above the determined noise threshold for the image portion as noise removing or filtering the frequencies above the determined frequency threshold applicable to an image portion. As a result of this depth based image filtering technique, in some embodiments out of focus image portions will be subject to filtering using filters with lower cut off frequencies than in-focus image portions and/or using filters which apply smoothing at a lower frequency to image portions which are out of focus with higher frequency content being preserved in in-focus portions than out of focus portions. The filtering technique thus applies, in some embodiments, filtering using a filter with a dynamically determined noise threshold with the threshold where the filtering begins being applied being determined based on image depth information alone or in combination with information about the optical characteristics and/or optical transfer function of the camera module used to capture the image portion being filtered.

It should be appreciated that for camera modules having different physical characteristics resulting in different optical transfer functions, the cutoff frequency may and sometimes is different for the different modules with the filter cutoff frequency depending in some embodiments on the optical transfer function of particular optical module being used to capture an image as well as depth information used to determine if an image portion corresponds to an in-focus or out of focus depth.

In accordance with some features of various embodiments, image noise is reduced and/or eliminated by using the 3D geometry of a scene and the optical characteristics including, e.g., aperture settings, of a camera module used to capture an image.

Camera settings with open aperture lead to shallow depth-of-field images. This implies that large parts of the scene, e.g., captured image of the scene area, are blurred. In other words, these parts of the scene do not have high-frequency components. Thus in some embodiments by choosing appropriate optical settings the high frequency components are avoided/eliminated from a number of image portions. However, few sources of noise are independent of the aperture setting. Such noise sources add noise and cause even the out-of-focus regions to have unintended high frequency components. In fact, even small amount of noise in such out-of-focus regions is completely out-of-place and is perceptually annoying.

In accordance with the features of some embodiments noise reduction/removal from such out-of-focus regions achieved by determining and using i) camera settings, e.g., such as including the aperture setting and the object distance lens setting, and ii) depth of scene elements is the scene. While the optical settings for a camera module used to capture the image is available in most cases, various embodiments of the present invention allow for determining and using the depth information for the scene area to reduce noise.

More formally, the exemplary multi-camera module system enables inferring the 3D geometry of the scene and making use of that in image noise reduction. In accordance with one aspect of some embodiments, determining the 3D scene geometry, e.g., depth map of the scene, and the object distance allows for hypothesizing the maximum amount of high-frequency components present in the neighborhood of any given pixel. Thus in various embodiments high-frequency components in every neighborhood in the scene are determined, e.g., for each region in the captured image a maximum expected high frequency is determined. Frequency components in that region above the maximum expected frequency for that given region indicates the presence of noise. Thus the maximum expected frequency information is used in various embodiments to appropriately design filters for removing and/or reducing the high frequency components from each image region. Filtering noise using such a filter design has many advantages, including:

i) Aggressive smoothing only in the out-of-focus regions. As these regions, by definition, do not have detailed information, e.g., image detail, thus smoothing does not cause loss of desirable information.
ii) Mild or no smoothing for the in-focus regions.
iii) No loss of texture.

A simple exemplary method in accordance with one embodiment may be summarized in the following steps:

1) Determine the 3D geometry of a scene area, e.g., area of interest. The 3D geometry of the scene area can be determined in a variety of ways using the features of the present invention, e.g., using a depth sensor to capture depth information, or using the exemplary multi-camera system of the present invention. In some embodiments the exemplary camera device of the present invention includes a depth sensing element capable of determining depth information for the scene and generating a depth map, however in some other embodiments the depth information may be obtained from an external depth sensing equipment and used. In some embodiments the depth information is generated by using images captured by a plurality of optical chains, e.g., camera modules, included in the exemplary camera device of the present invention.
2) Hypothesize the amount of high-frequency components that should be present using the 3D geometry and the optical characteristics, e.g., object distance lens setting, of the camera module(s).
3) Analyze the frequency components in each region/portion of the scene and determine maximum expected frequency in each region, e.g., neighborhood of each given pixel.
4) Design filters, e.g., low-pass filters, to remove the high frequency noise components above the maximum expected frequency for each region.

In various embodiments the denoising leads to the added advantage of increased compressibility. Specifically, compressibility of an image increases as the unintended high-frequency component (noise) is eliminated. Thus it should be appreciated that various advantages/benefits are achieved with the features of the present invention.

An exemplary camera device in accordance with some embodiments comprises: a first camera module; and a processor configured to: determine a first plurality of maximum expected frequencies, each of the first plurality of maximum expected frequencies corresponding to the first camera module and a different depth, the first plurality of maximum expected frequencies including a first maximum expected frequency corresponding to the first camera module and a first depth and a second maximum expected frequency corresponding to the first camera module and a second depth; receive portions of a first image captured by the first camera module; and perform first filtering on individual portions of the first image captured by the first camera module based on a depth to which each individual portion corresponds.

An apparatus in accordance with an exemplary embodiment comprises: a maximum expected frequency determination module configured to determine a first plurality of maximum expected frequencies, each of the first plurality of maximum expected frequencies corresponding to a first camera module and a different depth, the first plurality of maximum expected frequencies including a first maximum expected frequency corresponding to the first camera module and a first depth and a second maximum expected frequency corresponding to the first camera module and a second depth; a processing module configured to receive portions of a first image captured by the first camera module; and a filtering module configured to perform first filtering on individual portions of the first image captured by the first camera module based on a depth to which each individual portion corresponds. In one embodiment the apparatus is a post image capture processing device, e.g., such as a computer, including a memory, a processor and a wired/wireless interface. In some embodiments the apparatus is a camera including the first camera module.

In some embodiments the filtering module is configured to filter a first portion of the first image corresponding to the first depth to remove or reduce frequency content above the first maximum expected frequency corresponding to the first camera module, as part of performing the first filtering. In some embodiments the filtering module is further configured to filter a second portion of the first image corresponding to the second depth to remove or reduce frequency content above the second maximum expected frequency corresponding to the first camera module, as part of performing the first filtering. In some embodiments the filtering module is further configured to filter a third portion of the first image corresponding to a third depth to remove or reduce frequency content above a third maximum expected frequency, as part of performing the first filtering.

In some embodiments the apparatus further comprises: a depth map generation module configured to determine depths to which different portions of the first image correspond to. In some embodiments the filtering module is configured to apply the first filtering to portions of the first image based on the determined depth of the individual image portions. In some embodiments the depth map generation module is configured to generate a depth map for a scene area corresponding to the first image and determine depths to which different portions of the first image correspond based on the depth map. In some embodiments the depth map generation module is further configured to generate the depth map from multiple images of the scene area captured by different camera modules. In some other embodiments the depth map is generated by a depth sensing device which may be included as part of the apparatus or which may be a standalone depth sensing device providing the depth information and/or generated depth map to the apparatus via an interface.

In some embodiments the maximum expected frequency determination module is further configured to determine a second plurality of maximum expected frequencies, each of the second plurality of maximum expected frequencies corresponding to a second camera module and the different depth, the second plurality of maximum expected frequencies including a first maximum expected frequency corresponding to the second camera module and the first depth and a second maximum expected frequency corresponding to the second camera module and the second depth. In some embodiments the image processing module is further configured to receive portions of a second image captured by the second camera module, and the filtering module is further configured to perform second filtering on individual portions of the second image captured by the second camera module based on a depth to which each individual portion being filtered corresponds.

In some embodiments the filtering module is further configured to filter a first portion of the second image corresponding to the first depth to remove or reduce frequency content above the first maximum expected frequency corresponding to the second camera module, filter a second portion of the second image corresponding to the second depth to remove or reduce frequency content above the second maximum expected frequency corresponding to the second camera module, filter a third portion of the second image corresponding to a third depth to remove or reduce frequency content above a third maximum expected frequency corresponding to the second camera module, as part of being configured to perform the second filtering.

In some embodiments a generated filtered composite image including filtered portions of the first and second images is stored in a memory, transmitted via an interface or displayed on a display screen. In some embodiments the image processing module is further configured to generate the filtered composite image by combining the filtered portions of the first and second images generated by the filtering module by filtering portions of the first image by performing the first filtering and filtering portions of the second image by performing the second filtering. In some embodiments the filtered composite image is generated by the filtering module by filtering portions of a composite image including portions of the first image captured by the first camera module and portions of the second image captured by the second camera module.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image capture systems including tablet and cell phone devices which support or provide image capture functionality.

Images captured by the camera devices described herein may be real world images useful for documenting conditions on a construction site, at an accident and/or for preserving personal information whether the information be about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed:

1. A method of generating an image, the method comprising:
   determining a first plurality of maximum expected frequencies, each of the first plurality of maximum expected frequencies corresponding to a first camera module and a different depth, said first plurality of maximum expected frequencies including a first maximum expected frequency corresponding to said first camera module and a first depth and a second maximum expected frequency corresponding to the first camera module and a second depth;
   receiving portions of a first image captured by said first camera module; and
   performing first filtering on individual portions of said first image captured by said first camera module, said first filtering including filtering individual portions of said first image corresponding to different depths using different filters, the filter being used on an individual portion being based on a depth to which the individual portion of said first image, to which the filter is applied, corresponds.

2. The method of claim 1, wherein said first filtering includes filtering a first portion of said first image corresponding to the first depth with a filter which removes or reduces frequency content above said first maximum expected frequency corresponding to said first camera module.

3. The method of claim 2, wherein said step of determining a first plurality of maximum expected frequencies is performed prior to said first filtering.

4. The method of claim 2,
   wherein said first filtering further includes filtering a second portion of said first image corresponding to the second depth with a second filter which removes or reduces frequency content above said second maximum expected frequency corresponding to the first camera module; and
   wherein said first filtering further includes filtering a third portion of said first image corresponding to a third depth with a third filter which removes or reduces frequency content above a third maximum expected frequency.

5. The method of claim 4, further comprising:
   prior to performing said first filtering, determining depths to which different portions of said first image correspond to; and
   applying said first filtering to portions of said first image based on the determined depth of the individual image portions.

6. The method of claim 5, wherein determining depths to which different portions of said first image correspond to include includes:
   generating a depth map for a scene area corresponding to said first image; and
   determining the depths to which portions of said first image correspond based on said depth map.

7. The method of claim 4, further comprising:
   determining a second plurality of maximum expected frequencies, each of the second plurality of maximum expected frequencies corresponding to a second camera module and a different depth, said second plurality of maximum expected frequencies including a first maximum expected frequency corresponding to said second camera module and the first depth and a second maximum expected frequency corresponding to the second camera module and the second depth;
   receiving portions of a second image captured by said second camera module; and
   performing second filtering on individual portions of said second image captured by said second camera module based on a depth to which each individual portion being filtered corresponds.

8. The method of claim 7, wherein said second filtering includes filtering a first portion of said second image corresponding to the first depth with a filter which removes or reduces frequency content above said first maximum expected frequency corresponding to said second camera module.

9. The method of claim 8, wherein said second filtering further includes filtering a second portion of said second image corresponding to the second depth with a second filter which removes or reduces frequency content above said second maximum expected frequency corresponding to said second camera module.

10. The method of claim 9, wherein said second filtering further includes filtering a third portion of said second image corresponding to a third depth with a third filter which removes or reduces frequency content above a third maximum expected frequency corresponding to the second camera module.

11. The method of claim 1, further comprising:
    prior to performing said first filtering, determining depths to which different portions of said first image correspond; and
    wherein performing first filtering on individual portions of said first image captured by said first camera module includes:
    applying filters having different cut off frequencies to individual image portions corresponding to different depths.

12. The method of claim 1, wherein performing first filtering on individual portions of said first image captured by said first camera module includes:
    using filters having different filter cut off frequencies to filter different portions of the first image where said different portions correspond to different depths, which of the plurality of different filters to be used for an individual portion of the first image being based on the depth to which the individual portion of the first image corresponds and a noise threshold determined for the depth.

13. The method of claim 12, wherein the filtering applied by one of said different filters removes or smoothes frequencies above the noise threshold determined for the depth of the individual image portion to which the filter is applied.

14. A camera device, comprising:
    a first camera module; and
    a processor configured to:
    determine a first plurality of maximum expected frequencies, each of the first plurality of maximum expected frequencies corresponding to the first camera module and a different depth, said first plurality of maximum expected frequencies including a first maximum expected frequency corresponding to said first camera module and a first depth and a second maximum expected frequency corresponding to the first camera module and a second depth;
    receive portions of a first image captured by said first camera module; and
    perform first filtering on individual portions of said first image captured by said first camera module, said first filtering including filtering individual portions of said first image corresponding to different depths using different filters, the filter being used on an individual portion being based on a depth to which the individual portion of said first image, to which the filter is applied, corresponds.

15. An apparatus, comprising:
a maximum expected frequency determination module configured to determine a first plurality of maximum expected frequencies, each of the first plurality of maximum expected frequencies corresponding to a first camera module and a different depth, said first plurality of maximum expected frequencies including a first maximum expected frequency corresponding to said first camera module and a first depth and a second maximum expected frequency corresponding to the first camera module and a second depth;
a processing module configured to receive portions of a first image captured by the first camera module; and
a filtering module configured to perform first filtering on individual portions of said first image captured by said first camera module, said first filtering including filtering individual portions of said first image corresponding to different depths using different filters, the filter being used on an individual portion being based on a depth to which the individual portion of said first image, to which the filter is applied, corresponds.

16. The apparatus of claim 15, wherein said filtering module is configured to filter a first portion of said first image corresponding to the first depth to remove or reduce frequency content above said first maximum expected frequency corresponding to said first camera module, as part of performing said first filtering.

17. The apparatus of claim 16, wherein said filtering module is configured to filter a second portion of said first image corresponding to the second depth to remove or reduce frequency content above said second maximum expected frequency corresponding to the first camera module, as part of performing said first filtering.

18. The apparatus of claim 17, wherein said filtering module is configured to filter a third portion of said first image corresponding to a third depth to remove or reduce frequency content above a third maximum expected frequency, as part of performing said first filtering.

19. The apparatus of claim 18, further comprising:
a processor configured to determine depths to which different portions of said first image correspond to; and
wherein said filtering module is configured to apply said first filtering to portions of said first image based on the determined depth of the individual image portions.

20. The apparatus of claim 19, wherein said processor is configured to:
generate a depth map for a scene area corresponding to said first image; and
determine depths to which different portions of said first image correspond based on said depth map.

21. The apparatus of claim 20, wherein said processor is further configured to generate said depth map from multiple images of said scene area captured by different camera modules.

22. The apparatus of claim 18,
wherein said maximum expected frequency determination module is further configured to determine a second plurality of maximum expected frequencies, each of the second plurality of maximum expected frequencies corresponding to a second camera module and said different depth, said second plurality of maximum expected frequencies including a first maximum expected frequency corresponding to said second camera module and the first depth and a second maximum expected frequency corresponding to the second camera module and the second depth;
wherein said image processing module is further configured to receive portions of a second image captured by said second camera module; and
wherein said filtering module is further configured to perform second filtering on individual portions of said second image captured by said second camera module based on a depth to which each individual portion being filtered corresponds.

23. A non-transitory machine readable medium for use in a camera including a first image sensor and a second image sensor, the non-transitory machine readable medium including processor executable instructions which when executed control a processor to:
determine a first plurality of maximum expected frequencies, each of the first plurality of maximum expected frequencies corresponding to a first camera module and a different depth, said first plurality of maximum expected frequencies including a first maximum expected frequency corresponding to said first camera module and a first depth and a second maximum expected frequency corresponding to the first camera module and a second depth;
receive portions of a first image captured by said first camera module; and
perform first filtering on individual portions of said first image captured by said first camera module, said first filtering including filtering individual portions of said first image corresponding to different depths using different filters, the filter being used on an individual portion being based on a depth to which the individual portion of said first image, to which the filter is applied, corresponds.

* * * * *